United States Patent
Sugaya et al.

(10) Patent No.: US 9,467,497 B2
(45) Date of Patent: Oct. 11, 2016

(54) IMAGE FORMING DEVICE AND WEB APPLICATION SYSTEM

(71) Applicant: KONICA MINOLTA, INC., Chyoda-ku, Tokyo (JP)

(72) Inventors: Takashi Sugaya, Toyokawa (JP); Jun Kunioka, Okazaki (JP); Hiroshi Iwamoto, Toyohashi (JP); Takeshi Hibino, Toyokawa (JP); Yukina Hisada, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/702,207

(22) Filed: May 1, 2015

(65) Prior Publication Data
US 2015/0324159 A1 Nov. 12, 2015

(30) Foreign Application Priority Data
May 9, 2014 (JP) .................................. 2014-098104

(51) Int. Cl.
| | |
|---|---|
| *G06F 3/12* | (2006.01) |
| *H04L 29/08* | (2006.01) |
| *G06F 17/30* | (2006.01) |
| *H04N 1/00* | (2006.01) |
| *G06K 15/00* | (2006.01) |

(52) U.S. Cl.
CPC .............. *H04L 67/02* (2013.01); *G06F 3/1268* (2013.01); *G06F 3/1285* (2013.01); *G06F 17/30* (2013.01); *H04N 1/00127* (2013.01)

(58) Field of Classification Search
None
See application file for complete search history.

(56) References Cited

U.S. PATENT DOCUMENTS

2001/0029521 A1* 10/2001 Matsuda ........... G06F 17/30893
 709/201
2012/0239698 A1*  9/2012 Ohtake ............. G06F 17/30557
 707/781

FOREIGN PATENT DOCUMENTS

| JP | 2003-233585 A | 8/2003 |
|---|---|---|
| JP | 2008-077541 | 4/2008 |
| JP | 2009-116678 A | 5/2009 |
| JP | 2012-073744 | 4/2012 |

OTHER PUBLICATIONS

Notification of Reasons for Rejection issued in corresponding Japanese Patent Application No. 2014-098104, dated Mar. 15, 2016, and English translation thereof.

* cited by examiner

*Primary Examiner* — Dov Popovici
(74) *Attorney, Agent, or Firm* — Buchanan Ingersoll & Rooney PC

(57) ABSTRACT

An image forming device having a function of a web server receives a data transmission request relating to a first web page from an external device; and transmits first data (including a first script for automatically transmitting a periodic request (first periodic request) from a browser of the external device to the web server) to the external device in response to the data transmission request. The image forming device transmits second data (including a second script for automatically transmitting a periodic request (second periodic request) from the browser to the web server while the second web page is being displayed) to the external device in response to a new page call command transmitted from the external device, the new page call command being for calling the second web page from the first web page.

25 Claims, 18 Drawing Sheets

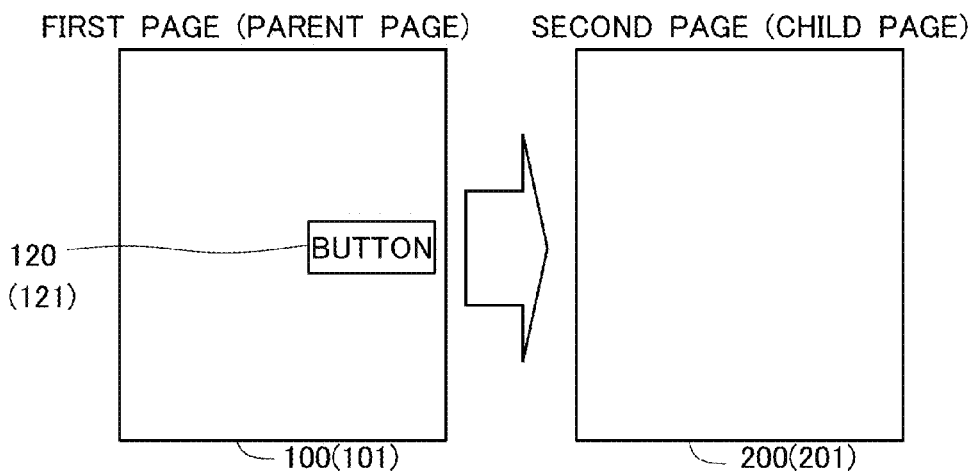
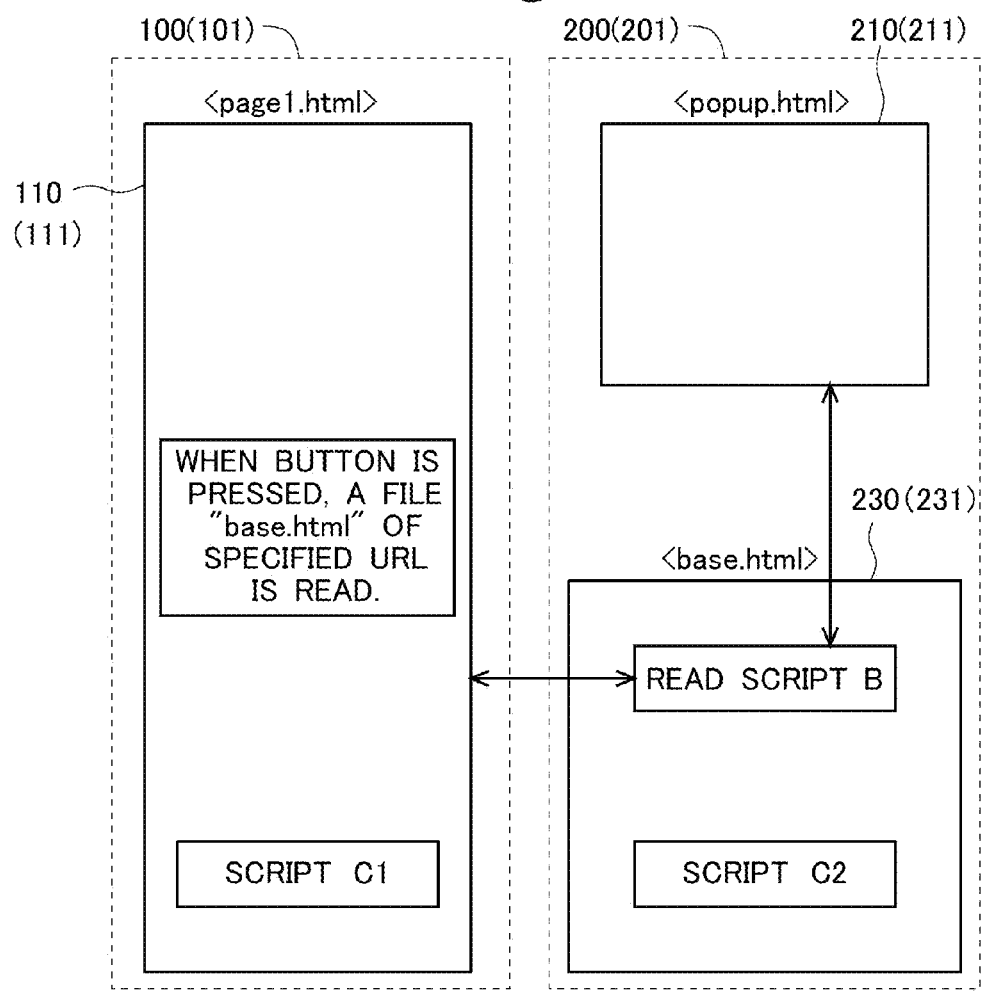

Fig.8

"base.html"

230(231)

```
<!DOCTYPE HTML PUBLIC "-//W3C//DTD HTML 4.01 Frameset//EN">
<HTML lang="en">
  <HEAD>
    <TITLE>LiveCheck</TITLE>
    <meta http-equiv="Expires" content="0">
    <meta http-equiv="Pragma" content="no-cache">
    <meta http-equiv="Content-Type" content="text/html;charset=UTF-8">
    <meta content="text/javascript" http-equiv="Content-Script-Type">
  </HEAD>
  <SCRIPT language="JavaScript">
  <!--
    /*READ SCRIPT*/
    var url = window.opener.popupURL;
    document.getElementById(popup_screen).src = url;
    /*CALL EVERY 30 SECONDS*/
    function liveCheck() {
      document.getElementById(livecheck_data).contentWindow.location.reload(true);
    }
  -->
  </SCRIPT>
  <BODY onload="setInterval('liveCheck()',30000)">
    <IFRAME name="livecheck_data" id="livecheck_data" src="livecheck_data.html"
            frameborder=... height=... width=...></IFRAME>
    <IFRAME name="popup_screen" id="popup_screen" frameborder=... height=... width=...></IFRAME>
    ...
  </BODY>
</HTML>
```

P1 — /*READ SCRIPT*/ ... src = url;
P3 — /*CALL EVERY 30 SECONDS*/ ... function liveCheck() { ... }
P5 — `<IFRAME name="livecheck_data" ...>`
P4 — frameborder=... height=... width=...
P2 — `<IFRAME name="popup_screen" ...>`

ABBREVIATED ADDRESS LIST

SEARCH BY NUMBER  1-50 ▶  Go

SEARCH BY TEXT  ▶  Go

SELECT BY FUNCTION  ▶  Go

| SELECT | No. | FUNCTIO | REGISTERED NAME | ADDRESS |
|--------|-----|---------|-----------------|---------|
| ☐ | 1 | E-mail | aaa | bsk1@***.com |
| ☐ | 2 | E-mail | 2 | bsk2@***.com |

OK   CANCEL

Fig.11

"page1.html"

```
var popupURL2 = "popup.html";
if(checkTablet) {
  popupURL2 = "base.html";
}
window.open(popupURL2);

function checkTablet(){
    if(navigator.userAgent.indexOf("MSIE") >= 0
        && isIENotSupportActiveX()){
      //IF TABLET
      return true;
    } else {
      //IF PC
      return false;
    }
}
function isIENotSupportActiveX() {
    if (navigator.userAgent.indexOf("Trident") != -1) {
      var tempXMLObject = null;
      try {
        tempXMLObject
          = new ActiveXObject('Microsoft.FreeThreadedXMLDOM');
      } catch(e) {
        //IF ModernUI AFTER IE10
        return true;
      }
      if (!tempXMLObject) {
        //IF ModernUI AFTER IE10
        return true;
      }
    }
    return false;
}
...
```

110(115)

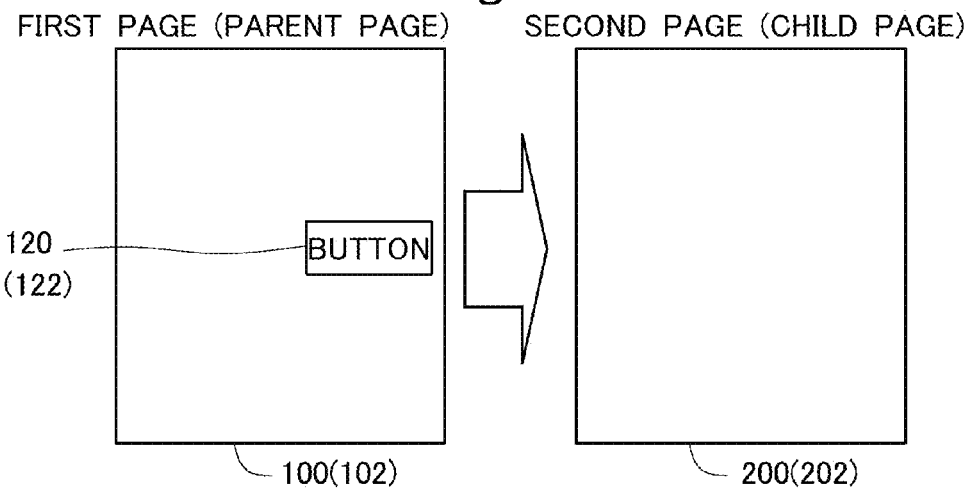
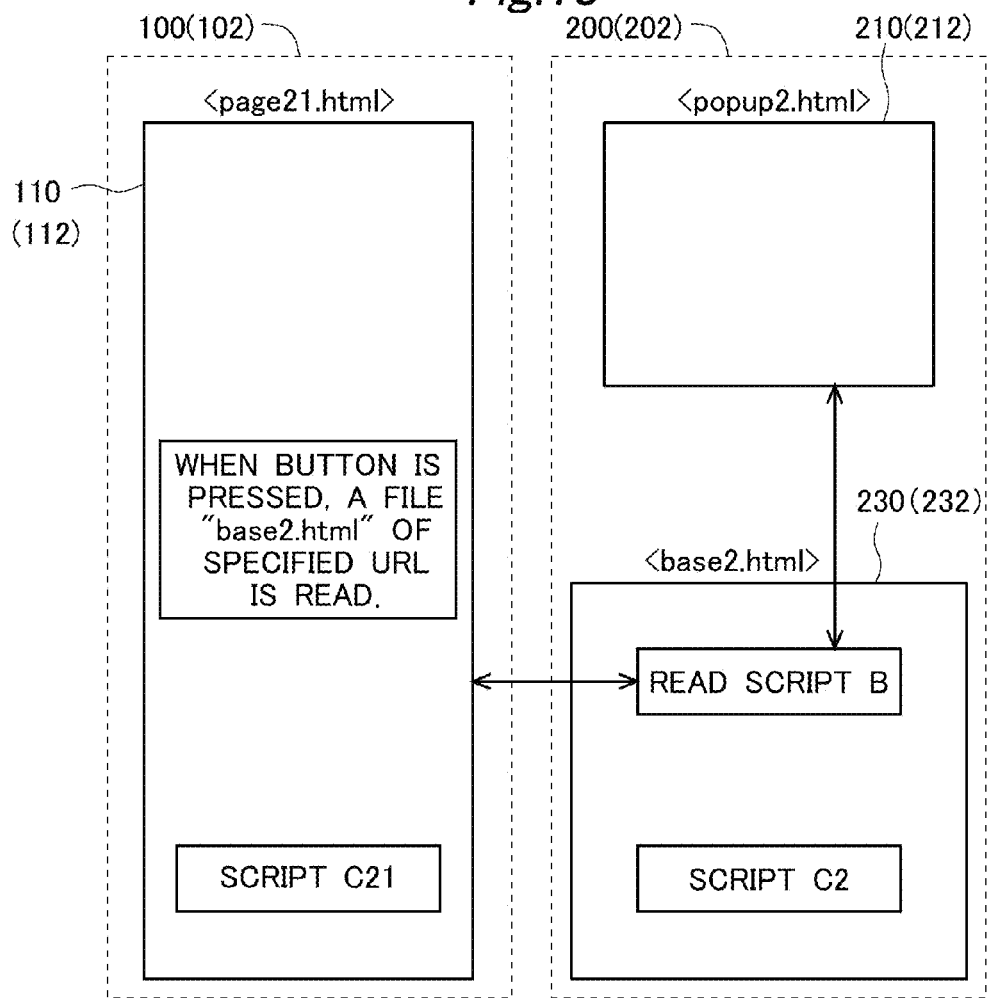

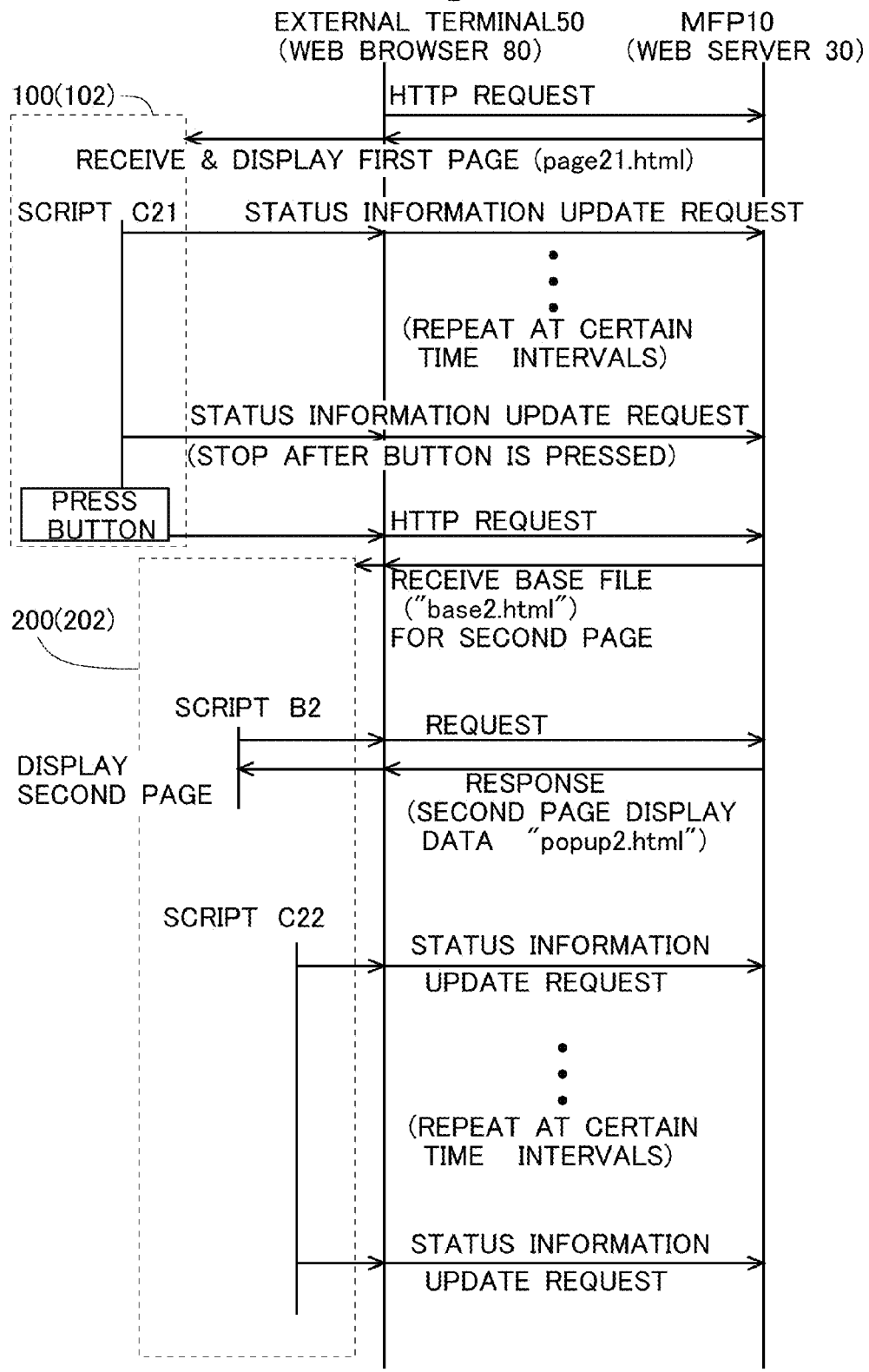

Fig. 15

"base2.html"

```
<!DOCTYPE HTML PUBLIC "-//W3C//DTD HTML 4.01 Frameset//EN">
<HTML lang="en">
<HEAD>
  <TITLE>Status</TITLE>
  <meta http-equiv="Expires" content="0">
  <meta http-equiv="Pragma" content="no-cache">
  <meta http-equiv="Content-Type" content="text/html;charset=UTF-8">
  <meta content="text/javascript" http-equiv="Content-Script-Type">
</HEAD>
<SCRIPT language="JavaScript">
<!--
  var url = window.opener.popupURL;
  document.getElementById(popup_screen).src = url;
  function statusUpdate() {
    document.getElementById(status_data).content(Window.location.reload(true));
  }
  /*REFLECT SETTING*/
  function setStatus() {
    ...
    window.opener.document.getElementById("parent_status") = document.getElementById("child_status");
    ...
  }
-->
</SCRIPT>
<BODY onload="setInterval('statusUpdate()',30000)">
<IFRAME name="status_data" id="status.html" onload="setStatus()"
        frameborder=... height=... width=...></IFRAME>
<IFRAME name="popup_screen" id="popup_screen" frameborder=... height=... width=...></IFRAME>
...
</BODY>
</HTML>
```

"status.html"

```
<!DOCTYPE HTML PUBLIC "-//W3C//DTD HTML 4.01 Frameset//EN">
<HTML lang="en">
  <HEAD>
    <TITLE>Status</TITLE>
    <meta http-equiv="Expires" content="0">
    <meta http-equiv="Pragma" content="no-cache">
    <meta http-equiv="Content-Type" content="text/html;charset=UTF-8">
    <meta content="text/javascript" http-equiv="Content-Script-Type">
  </HEAD>
  <BODY>
    <div id="child_status">no paper</div>
    ...
  </BODY>
</HTML>
```

P31

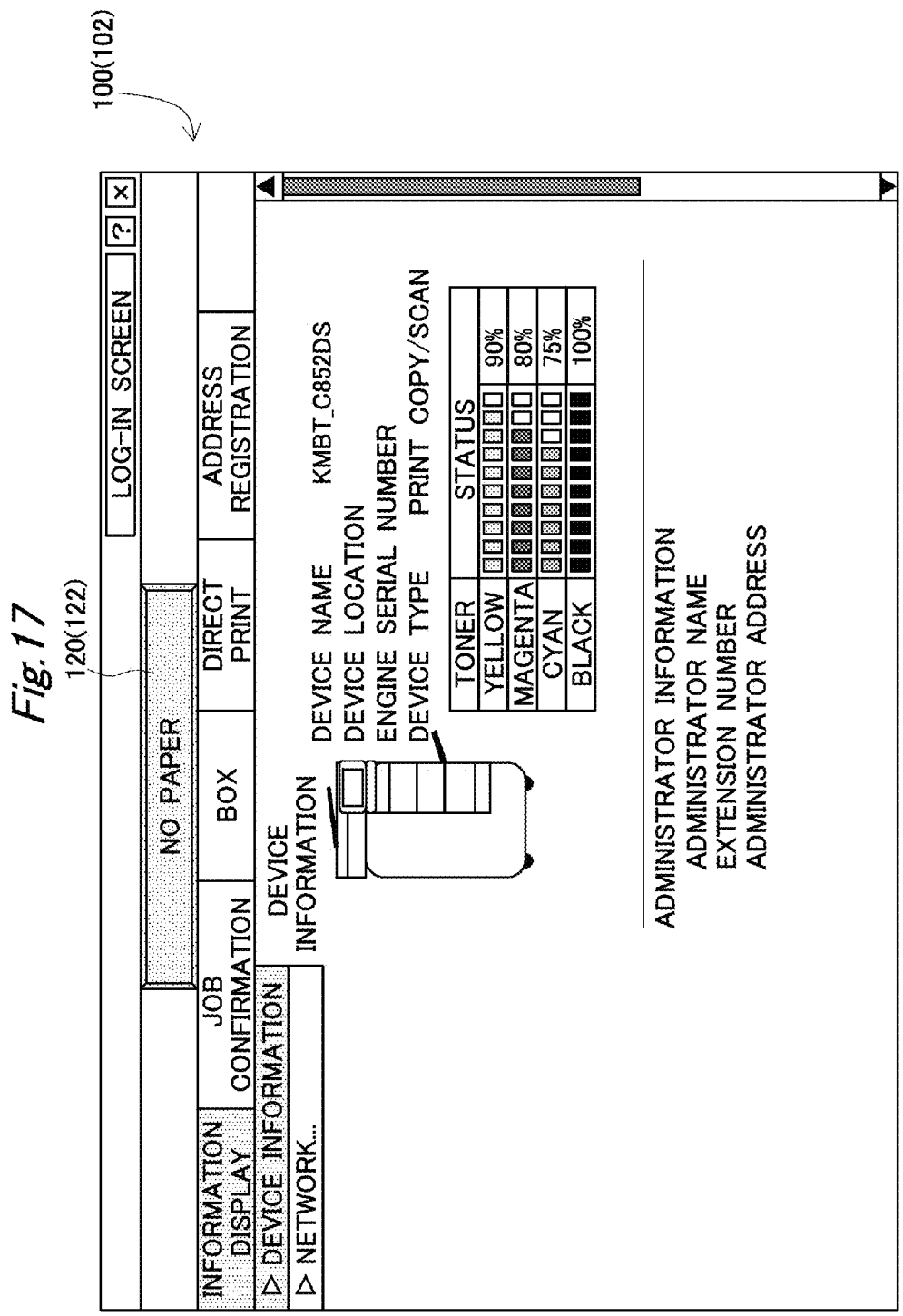

IMAGE FORMING DEVICE AND WEB APPLICATION SYSTEM

This application is based on Japanese Patent Application No. 2014-098104 filed on May 9, 2014, the contents of which are hereby incorporated by reference.

BACKGROUND OF THE INVENTION

1. Field of the Invention

The present invention relates to an image forming device such as an MFP (Multi-Functional Peripheral), as well as a technique relating to such an image forming device.

2. Description of the Background Art

Conventionally, there is a technique for viewing, changing, and the like of information relating to an image forming device, such as an MFP, having a web server built therein, by accessing the web server from a web browser in a device external to the image forming device.

Due to reasons such as limitation of a memory capacity (RAM capacity or the like), such an image forming device has an upper limit for a number of communication sessions by the web server in the image forming device (in other words, a number of external devices (or the web browsers) with which the web server is able to establish a communication session).

By contrast, there is a technique for effectively utilizing such a limited number of communication sessions (see Japanese Patent Application Laid-Open No. 2003-233585, for example). According to Japanese Patent Application Laid-Open No. 2003-233585, after one communication session is established, a request is transmitted from a client to a server periodically (at regular intervals) to confirm whether or not to continue the communication session. According to this technique, the communication session continues if a request is transmitted from the client to the server within a certain period (e.g., one to several minutes), and the communication session is terminated if a request has not been transmitted over a period longer than the certain period.

In the meantime, examples of the external device (external terminal) accessing the web server in the image forming device include devices such as so-called tablet terminals, in addition to personal computers. For tablet terminals (in particular, OSs (operating systems) for tablet terminals), various measures have been made in order to use limited hardware resource effectively. For example, regarding an operation of the web browser, a script embedded in a web page is activated during a period in which the web page is active (active period), but the script is not activated during a period in which the web page is not active (non-active period).

Therefore, according to the above technique (Japanese Patent Application Laid-Open No. 2003-233585), in a case in which a periodic request is transmitted from a web browser to a web server using a script embedded in a web page, if the web page becomes non-active, the script in the web page is not activated, and a periodic request is not transmitted. Then, the web server determines that the web browser is no longer used (continuation of the communication session is unnecessary), and disconnects the communication session with the web browser (client). As a result, a user operating the web browser is forced to perform a connection operation or the like to re-establish a communication session with the server.

As described above, there is a problem due to the fact that, in a case of accessing a web server from a browser that operates in a tablet terminal or the like, a request script in a parent page is not activated when a child page is called from a parent page displayed in the browser and the parent page is made non-active and the child page is made active.

The above problem may similarly occur not only in the case in which a parent page includes a script for transmitting a periodic request for maintaining a communication session as described above, but also in which the parent page includes a script for periodically displaying device information of an image forming device. For example, there may arise a problem that the device information in the parent page is not updated while the child page is being displayed, as a script in the parent page for updating the device information is not activated when the child page is called from the parent page displayed in the web browser and the parent page is made non-active and the child page is made active.

SUMMARY OF THE INVENTION

One of objects of the present invention is to provide a technique that eliminates the problem due to the fact that, in a case of accessing a web server from a browser that operates based on a tablet terminal OS or the like, a request script in a parent page is not activated when a child page is called from a parent page displayed in the browser and the child page is made active and the parent page is made non-active.

According to a first aspect of the present invention, an image forming device having a function of a web server includes: a receiving unit configured to receive a data transmission request from an external device, the data transmission request relating to a first web page; and a transmitting unit configured to transmit first data to the external device in response to the data transmission request, the first data including: first display data for displaying the first web page in a browser of the external device; data for calling a second web page from the first web page; and a first script for automatically transmitting a first periodic request as a periodic request from the browser to the web server, wherein the transmitting unit transmits second data to the external device in response to a new page call command transmitted from the external device, the new page call command being for calling the second web page from the first web page, the second data including: second display data for displaying the second web page in the browser; and a second script for automatically transmitting a second periodic request as a periodic request from the browser to the web server while the second web page is being displayed.

According to a second aspect of the present invention, a web application system includes: an image forming device having a function of a web server; and an external device capable of executing a browser, wherein, the web server includes: a receiving unit configured to receive a data transmission request from the external device, the data transmission request relating to a first web page; and a transmitting unit configured to transmit first data to the external device in response to the data transmission request, the first data including: first display data for displaying the first web page in a browser of the external device; data for calling a second web page from the first web page; and a first script for automatically transmitting a first periodic request as a periodic request from the browser to the web server, wherein the transmitting unit transmits second data to the external device in response to a new page call command transmitted from the external device, the new page call command being for calling the second web page from the first web page, the second data including: second display data for displaying the second web page in the browser; and a second script for automatically transmitting a second periodic request as a periodic request from the browser to the web server while the second web page is being displayed, and the browser: after receiving the first script included in the first data, automatically transmits the first periodic request to the web server based on the first script, and after receiving the second script included in the second data, automatically transmits the second periodic request to the web server based on the second script.

According to a third aspect of the present invention, a non-transitory computer-readable recording medium recording a program causes a computer, built within an image forming device having a function of a web server, to execute the steps of: a) receiving a data transmission request from an external device, the data transmission request relating to a first web page; b) transmitting first data to the external device in response to the data transmission request, the first data including: first display data for displaying the first web page in a browser of the external device; data for calling a second web page from the first web page; and a first script for automatically transmitting a first periodic request as a periodic request from the browser to the web server; c) receiving a new page call command transmitted from the external device, the new page call command being for calling the second web page from the first web page; and d) transmitting second data to the external device in response to the new page call command, the second data including: second display data for displaying the second web page in the browser; and a second script for automatically transmitting a second periodic request as a periodic request from the browser to the web server while the second web page is being displayed.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 4 and 5 are conceptual diagrams illustrating an operation in this system;

FIG. 8 is an illustration of a data file transmitted in response to a new page call command;

FIG. 10 is an illustration showing one example of a child page;

FIG. 11 is an illustration of a data file for executing an operation according to a modified example;

FIGS. 12 and 13 are conceptual diagrams illustrating an operation in a system according to a second embodiment;

FIG. 14 is a timing chart showing an example of the operation in the system according to the second embodiment;

FIG. 15 is an illustration of a data file transmitted in response to a new page call command in the second embodiment;

FIG. 16 is an illustration of a data file showing a status of the MFP;

FIG. 17 is an illustration showing one example of a parent page according to the second embodiment;

DESCRIPTION OF THE PREFERRED EMBODIMENTS

Hereinafter, embodiments of the present invention will be described with reference to the drawings.

1. First Embodiment 1-1. System Outline

Figure 1:
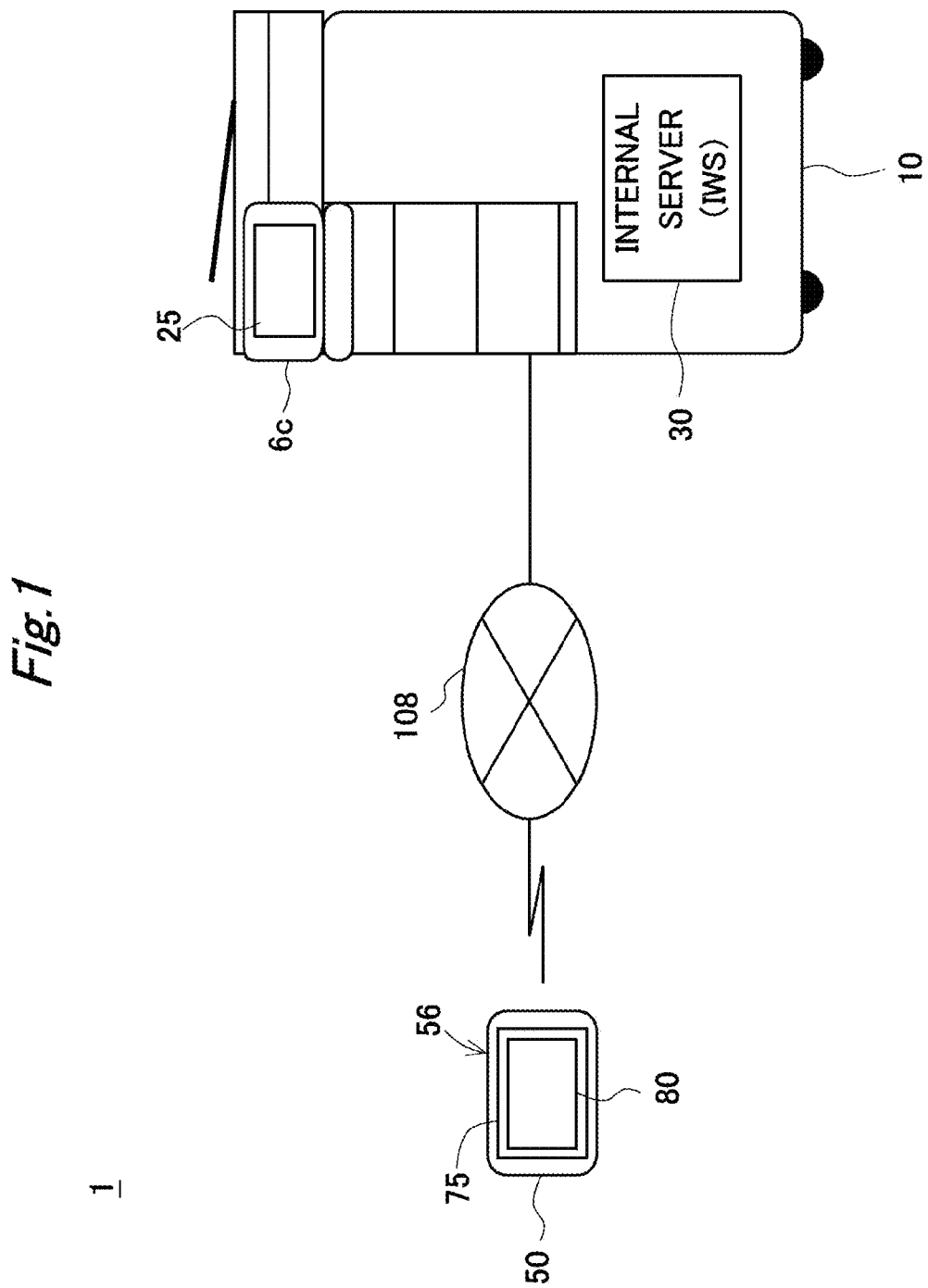
FIG. 1 is a schematic diagram illustrating a configuration of a web application system.

FIG. 1 is a schematic diagram illustrating a configuration of a remote-control operation system 1.

Referring to FIG. 1, the remote-control operation system 1 includes an image forming device 10 and an external terminal 50. Here, an MFP (Multi-Functional Peripheral) is shown as an example of the image forming device 10.

The image forming device 10 and the external terminal 50 are connected to each other via a network 108. The network 108 is configured as a LAN (Local Area Network), the Internet, or the like. Further, the connection to the network 108 may be wired or wireless. For example, the image forming device 10 is connected to the network 108 via a wire, and the external terminal 50 is connected to the network 108 wirelessly.

In the remote-control operation system 1, various operations to the image forming device 10 may be performed using the external terminal 50. Specifically, it is possible for the external terminal 50 to remotely control the image forming device 10.

The image forming device 10 also functions as a web server 30. A web browser 80 in the external terminal 50 is able to transmit and receive various information (such as device information relating to an MFP 10) to and from the web server 30, and to display the various information. The web browser 80 is also able to accept various operation inputs from an operator and, transmits setting and the like according to the operation inputs to the web server 30 to change the setting and the like of the MFP 10.

The remote-control operation system 1 is also referred to as a web application system, as it is a system constructed using the web server 30 and the web browser 80.

1-2. Configuration of MFP

Figure 2:
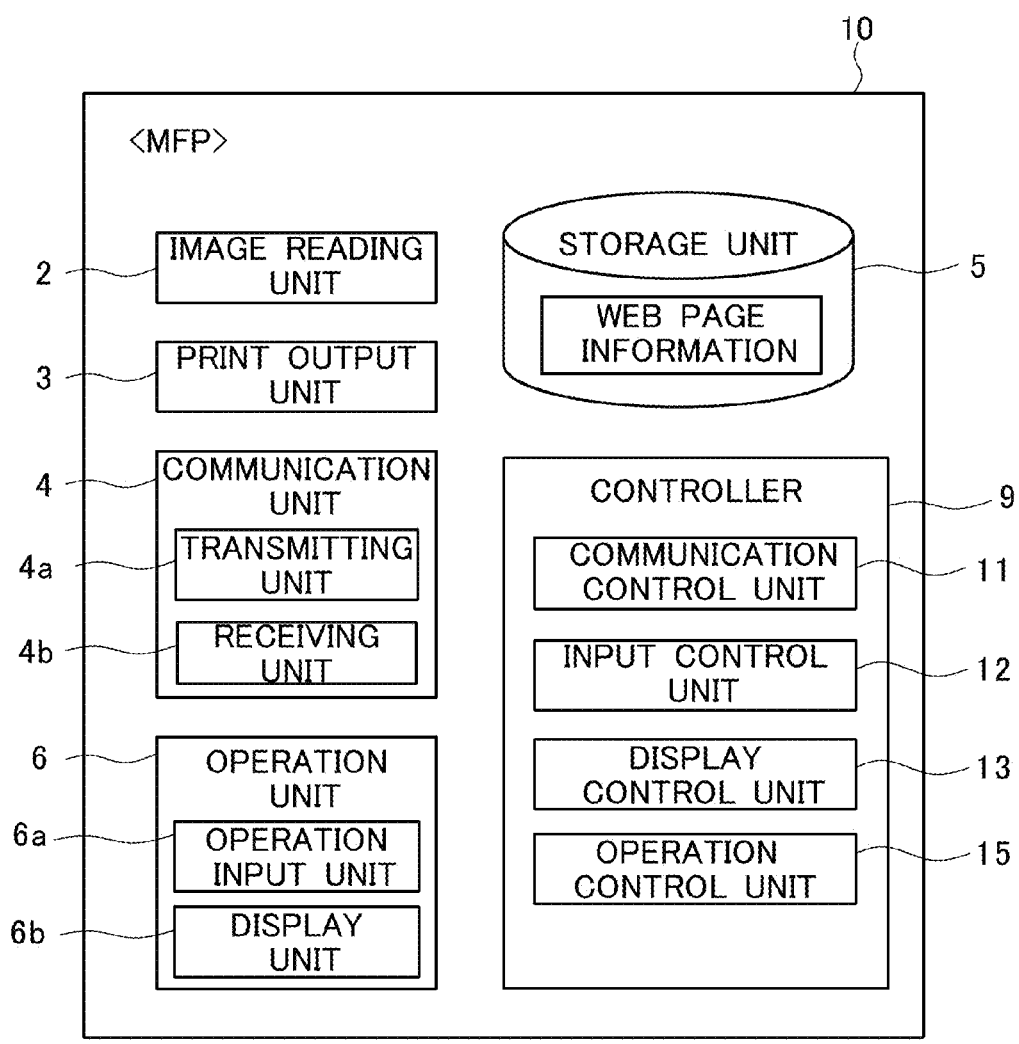
FIG. 2 is a functional block diagram illustrating a schematic configuration of an MFP.

FIG. 2 is a functional block diagram illustrating a schematic configuration of the MFP 10. The MFP 10 is a device (also referred to as a complex machine) having functions such as a scanning function, a copying function, a facsimile function, and a box-storage function.

The MFP 10 also functions as the web server 30. Various web page data in the web server 30 (specifically, various web page data (110, 210, 230, for example (will be described later)) transmitted from the web server 30 to the web browser 80) is stored in a storage unit 5. Each web page data is described in various page-description languages (such as HTML (HyperText Markup Language)) and script languages (such as JavaScript (registered trademark)).

As shown in the functional block diagram in FIG. 2, the MFP 10 includes an image reading unit 2, a print output unit 3, a communication unit 4, the storage unit 5, an operation unit 6, a controller 9, and the like, and realizes various functions by making these components operate in a complex manner.

The image reading unit 2 is a processing unit that optically reads (i.e., scans) a document placed at a predetermined position on the MFP 10, and generates image data of the document (also referred to as a document image or scan image). The image reading unit 2 is also referred to as a scanning unit.

The print output unit 3 is an output unit that prints and outputs images on various media such as paper based on data relating to a printing object. The print output unit 3 is also referred to as an image forming unit that forms images on various media.

The communication unit 4 is a processing unit having a capability of facsimile communication via a public line or the like. Further, the communication unit 4 is able to perform network communication via the network 108. In the network communication, for example, various protocols such as TCP/IP (Transmission Control Protocol/Internet Protocol) are used. By using the network communication, the MFP 10 is able to transmit or receive various data to or from a desired target (e.g., the external terminal 50). The communication unit 4 includes a transmitting unit 4a that transmits various data and a receiving unit 4b that receives the various data.

The storage unit 5 is configured as a storage device such as a hard disk drive (HDD). The storage unit 5 records image data of each operation screen, and the like.

The operation unit 6 includes an operation input unit 6a that accepts an operation input to the MFP 10, and a display unit 6b that displays and outputs various information.

The MFP 10 is provided with a substantially plate-like operation panel 6c (see FIG. 1). Further, the operation panel 6c has a touch panel 25 on its front side (see FIG. 1). The touch panel 25 functions as a part of the operation input unit 6a as well as a part of the display unit 6b. The touch panel 25 is configured by a liquid crystal panel having various sensors and the like embedded therein, and is able to display various information as well as to accept various operation inputs from the operator.

The controller 9 is a control device built in the MFP 10, and controls the MFP 10 as a whole. The controller 9 is configured as a computer system having a CPU, various semiconductor memories (RAM and ROM), and the like. The controller 9 realizes various processing units by causing the CPU to execute a predetermined software program (hereinafter simply referred to as a program) stored in a ROM (e.g., EEPROM). It should be noted that the program (specifically, a group of program modules) may be recorded in a portable recording medium such as a USB memory (in other words, various computer-readable non-transitory recording media), and then read from the recording medium and installed in the MFP 10. Alternatively, the program may be installed in the MFP 10 after being downloaded via the network 108, or the like.

Referring to FIG. 2, the controller 9 realizes various processing units including a communication control unit 11, an input control unit 12, a display control unit 13, and an operation control unit 15, by executing the above program.

The communication control unit 11 is a processing unit that controls a communication operation with a different device (such as the external terminal 50). For example, the communication control unit 11 transmits an image to be displayed (specifically, data thereof) of a touch panel 75 in the external terminal 50 to the external terminal 50, in cooperation with the communication unit 4.

The input control unit 12 is a control unit that controls an operation input operation to the operation input unit 6a (such as the touch panel 25). For example, the input control unit 12 controls an operation for accepting an operation input to an operation screen displayed in the touch panel 25.

The display control unit 13 is a processing unit that controls a display operation of the display unit 6b (such as the touch panel 25). The display control unit 13 displays an operation screen or the like for operating the MFP 10 in the touch panel 25.

The operation control unit 15 is a processing unit that controls an operation relating to functions of the web server. For example, the operation control unit 15 controls an operation for managing sessions with the web browser 80 (communication sessions). Further, the operation control unit 15 also controls an operation for obtaining status information of its own (the MFP 10) in response to a request from the web browser 80, and transmitting the status information to the web browser 80.

1-3. Configuration of External Terminal

Next, a configuration of the external terminal (also referred to as a remote control device) 50 will be described.

The external terminal 50 is a portable information input/output terminal device capable of performing network communication with other devices. Here, a tablet terminal is shown as an example of the external terminal 50. However, the external terminal 50 is not limited to this example, and may be a smartphone, a personal computer, or the like. Further, the external terminal 50 may be a portable device or a stationary device.

Figure 3:
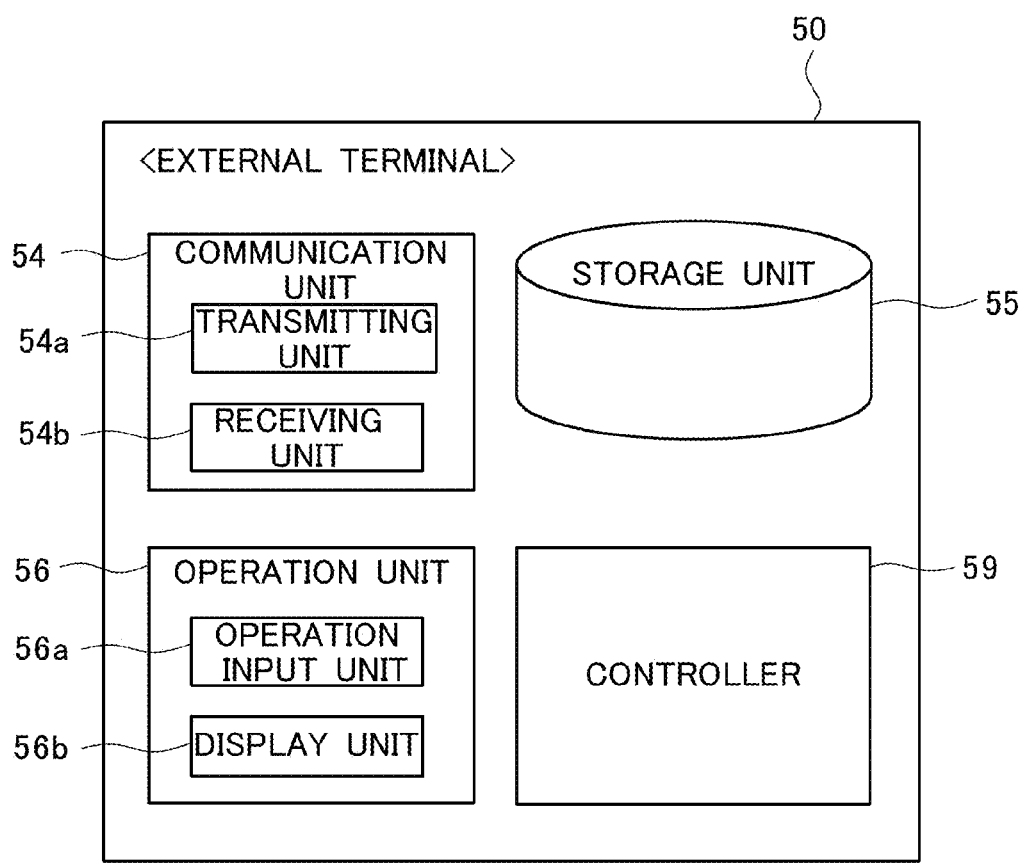
FIG. 3 is a functional block diagram illustrating a schematic configuration of an external terminal.

FIG. 3 is a functional block diagram illustrating a schematic configuration of the external terminal 50.

As shown by the functional block diagram in FIG. 3, the external terminal 50 includes a communication unit 54, a storage unit 55, an operation unit 56, a controller 59, and the like, and realizes various functions by making these components operate in a complex manner.

The communication unit 54 is able to perform network communication via the network 108. In the network communication, for example, various protocols such as TCP/IP (Transmission Control Protocol/Internet Protocol) are used. By using the network communication, the external terminal 50 is able to transmit or receive various data to or from a desired target (such as the image forming device 10). The communication unit 54 includes a transmitting unit 54a that transmits various data and a receiving unit 54b that receives the various data.

The storage unit 55 is configured as a storage device such as a non-volatile semiconductor memory. The storage unit 55 temporarily stores various image data (such as display data for the operation screen) transmitted from the MFP 10.

The operation unit 56 includes an operation input unit 56a that accepts an input to the external terminal 50, and a display unit 56b that displays and outputs various information. The external terminal 50 is provided with the touch panel 75 configured by a liquid crystal panel having a piezoelectric sensor or the like embedded therein (see FIG. 1). Specifically, the touch panel 75 is provided over the nearly entire surface of the substantially plate-like external terminal 50 on its front side, excluding its peripheral rim (frame portion). The touch panel 75 functions as a part of the operation input unit 56a as well as a part of the display unit 56b. The touch panel 75 displays an operation screen, and accepts operation inputs from the operator (also referred to as a user) to the operation screen.

The controller 59 is a control device built in the external terminal 50, and controls the external terminal 50 as a whole. The controller 59 is configured as a computer system having a CPU, various semiconductor memories (RAM and ROM), and the like. The controller 59 realizes various processing units by causing the CPU to execute a predetermined software program (hereinafter simply referred to as a program) stored in a recording unit (such as a semiconductor memory). It should be noted that the program may be recorded in a portable recording medium such as a USB memory (in other words, various computer-readable non-transitory recording media), and then read from the recording medium and installed in the external terminal 50. Alternatively, the program may be installed in the external terminal 50 after being downloaded via the network 108, or the like.

One example of this program is a web browser application program (hereinafter simply referred to as a "web browser" or "browser") 80. The web browser 80 transmits or receive various data to or from various web servers (including the web server 30 built in the MFP 10), and displays various screens in the touch panel 75 of the external terminal 50.

The web browser 80 includes a rendering engine and a script engine, and displays various screens and the like in the touch panel 75 of the external terminal 50 and executes various processing based on data such as HTML data and script data transmitted from the web server.

1-4. Operation According to Comparative Example

In the following, a technique according to a comparative example will be described with reference to FIG. 19 to FIG. 21 before an operation according to a first embodiment will be described.

Figure 19:
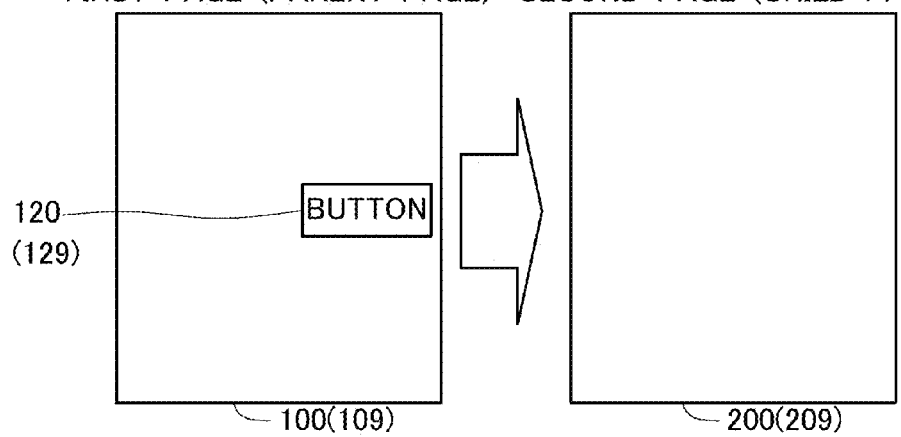
FIGS. 19 and 20 are conceptual diagrams illustrating an operation according to a comparative example.
Figure 20:
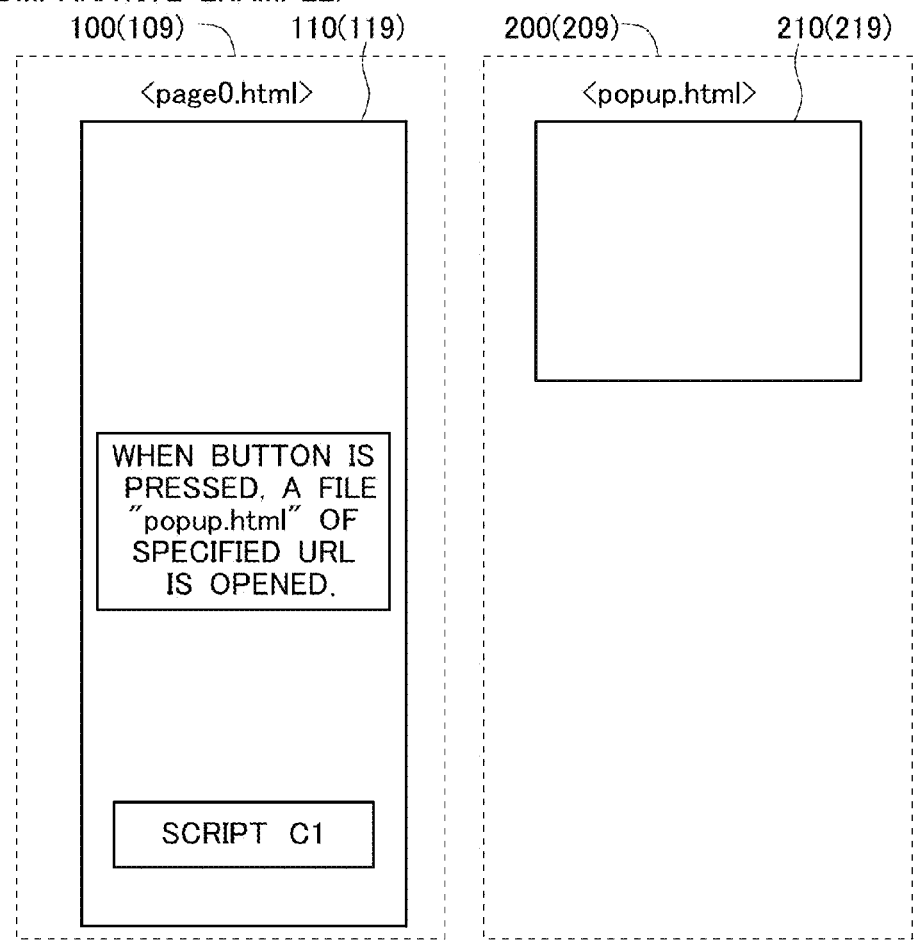
Figure 21:
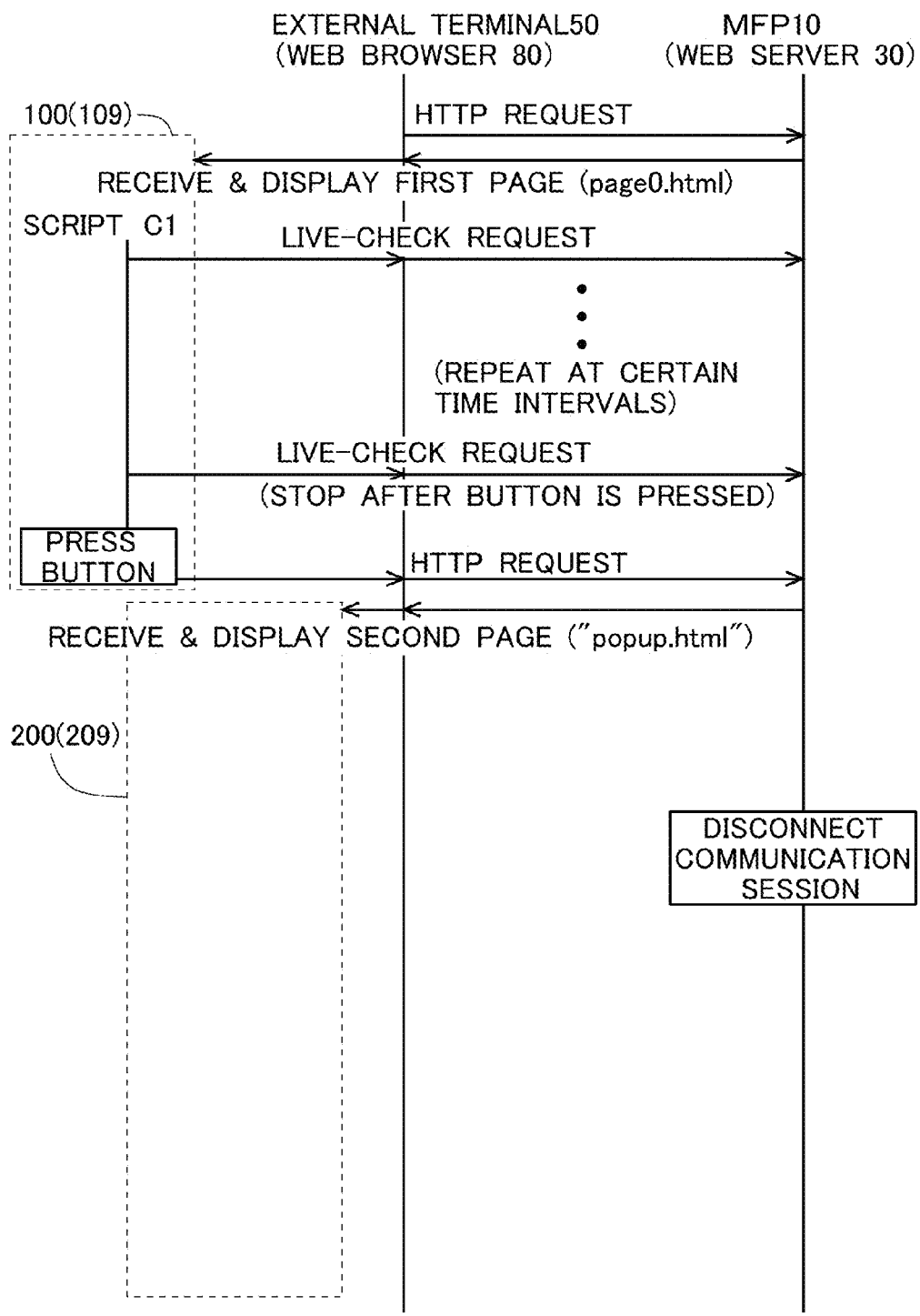
FIG. 21 is a timing chart showing an example of the operation according to the comparative example.

FIGS. 19 and 20 are conceptual diagrams illustrating the operation according to the comparative example, and FIG. 21 is a timing chart showing an example of the operation according to the comparative example.

First, an operator of the external terminal 50 inputs log-in information to a displayed screen (the displayed screen of the web browser 80) displayed in the touch panel 75 of the external terminal 50 (FIG. 1), and the log-in information is transmitted from the external terminal 50 to the MFP 10 (the web server 30). The MFP 10 allows the operator of the external terminal 50 to log in after confirming identity between the log-in information from the external terminal 50 and legitimate log-in information. In this manner, the operator of the external terminal 50 remotely logs in the MFP 10. Further, the MFP 10 (the web server 30) generates management information of communication sessions, and starts a control operation of a communication session between the external terminal 50 and the MFP 10. To put it shortly, a session between the web server 30 and the web browser 80 starts. As described later, the MFP 10 disconnects the communication session with the external terminal 50 (the web browser 80), when a request from the external terminal 50 (the web browser 80) is not received over a certain period of time.

Then, as shown at the head of FIG. 21, the external terminal 50 transmits an HTTP request (also referred to as a request for transmission of data relating to the web page 100) to the MFP 10, in order to display a web page 100 (109). Specifically, an HTTP request specifying a specific URL (Uniform Resource Locator) in the web server 30 of the MFP 10 is transmitted. The specific URL includes a host name, a path name, and a file name (e.g., "page0.html") relating to the web page 100.

In response to the HTTP request, the MFP 10 (the web server 30) transmits web page data (specifically, data file) 119 for the web page 109 ("page0.html") as an HTTP response to the external terminal 50.

The external terminal 50 (the web browser 80) displays the web page 109 in the touch panel 75 based on the web page data 119 received from the web server 30. For example, the web page 109 similar to the web page 100 in FIG. 9 that will be later described is displayed in the touch panel 75 (see a left side in FIG. 19).

In the web page 109, a button 120 (129) for displaying a pop-up page (child page) is arranged (FIG. 19). The web page data 119 relating to the web page 109 includes data for displaying the button 129 (described in a page-description language), as well as data indicating a URL of a pop-up page (child page) 200 to be called in response to pressing of the button 129. The web page data 119 also includes a script C1.

Further, the web browser 80 of the external terminal 50 executes the script C1 (e.g., a script described in JavaScript (registered trademark)) included in the web page data 119. The script C1 is a script having a function of transmitting a live-check request (a request used for notification that the web browser 80 is "live" (in operation)) periodically to the MFP 10. By executing the script C1, the web browser 80 transmits the live-check request to the MFP 10 (the web server 30) at predetermined time intervals $\Delta t1$.

Figure 7:
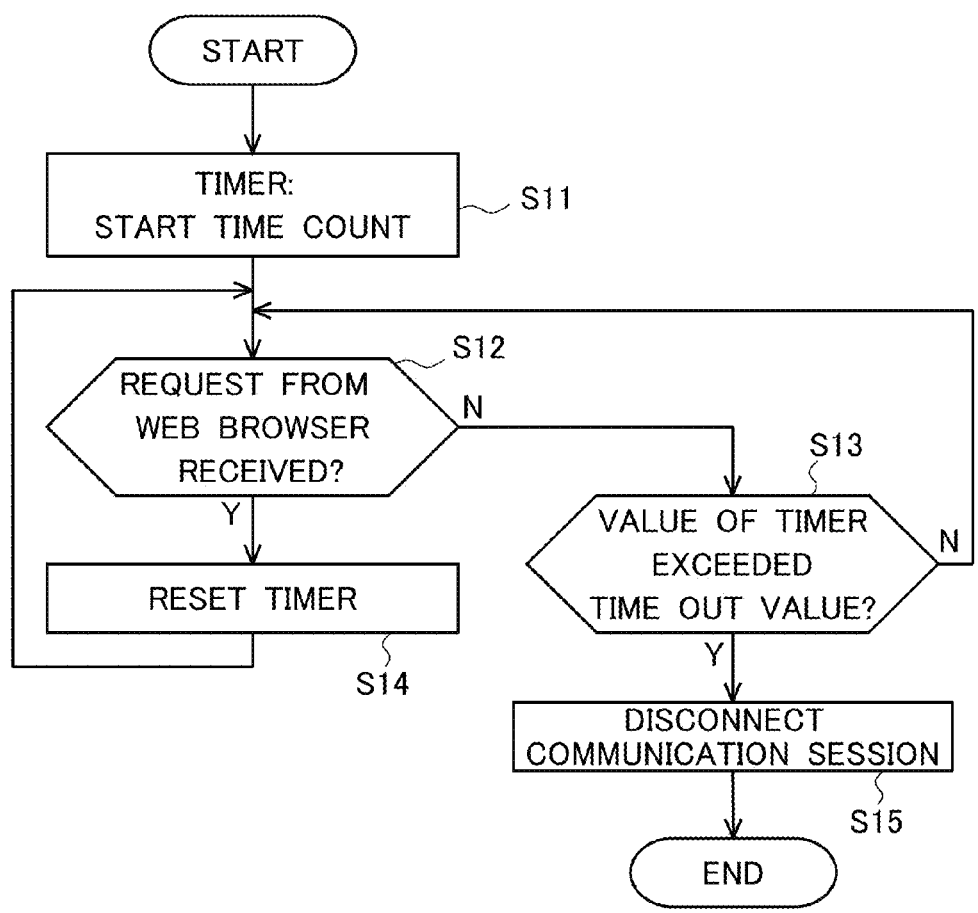
FIG. 7 is a flow chart showing a management operation of a communication session by the MFP (web server)

On the other hand, the operation control unit 15 of the MFP 10 (the web server 30) executes the management operation of a communication session as shown in FIG. 7.

Specifically, firstly in Step S11, time count using a timer starts.

Then, in Step S12, it is determined whether or not a request (live-check request) from the web browser 80 has been received.

If it is determined that the request has been received, the process moves to Step S14.

In Step S14, a value of the timer is reset, the process moves back to Step S12, and the process continues while the communication session is maintained.

On the other hand, if it is determined that the request has not been received, the process moves to Step S13. In Step S13, it is determined whether or not the value of the timer (a count value of the timer) has reached a time out value (a count value corresponding to $\Delta t1$ (e.g., 30 seconds)).

If it is determined that the value of the timer has not exceeded the time out value, the process moves back to Step S12.

On the other hand, if it is determined that the value of the timer has exceeded the time out value, the process moves to Step S15. In Step S15, the communication session between the external terminal 50 (the web browser 80) and the MFP 10 (the web server 30) is disconnected, and the session management information relating to the communication session is deleted.

As described above, the operation control unit 15 of the MFP 10 confirms that the web browser 80 is in operation ("live") by periodically receiving a request from the web browser 80 of the external terminal 50. Specifically, when the parent page 100 (the web page 109, in this case) is displayed in an active state in the web browser 80, the periodic operation for transmitting a request based on the script C1 for request in the parent page 100 continues. In this case, the operation control unit 15 of the MFP 10 confirms that the web browser 80 is in operation, and maintains the communication session with the web browser 80 (the external terminal 50).

On the other hand, when the web browser 80 is terminated, the periodic operation for transmitting a request based on the script C1 stops. When a periodic request from the web browser 80 of the external terminal 50 is not received for a certain period of time, the operation control unit 15 of the MFP 10 determines that the web browser 80 is not in operation, and disconnects the communication session with the web browser 80 (the external terminal 50).

Thereafter, when the operator presses the button 120 (129) arranged in the parent page 100 (the web page 109), the pop-up page 200 (209) is displayed (see a right side in FIG. 19).

Specifically, when the button 129 is pressed by the operator, an HTTP request specifying a different URL in the web server 30 based on the description in the web page data 119 ("page0.html") is transmitted from the web browser 80. The different URL includes a host name, a path name, and a file name (e.g., "popup.html") relating to web page data (data file) 219 for displaying the web page 209.

In response to the HTTP request, the MFP 10 (the web server 30) transmits the web page data 219 ("popup.html") of the web page 209 as an HTTP response to the external terminal 50.

The external terminal 50 (the web browser 80) displays the web page 209 in the touch panel 75 based on the received web page data 219. For example, a web page similar to the web page 200 in FIG. 10 is displayed in the touch panel 75 as the pop-up page 209 (also see a right side in FIG. 19).

Here, an OS (operating system) for a tablet terminal is installed in the external terminal 50, and the web browser 80 operates on the OS for a tablet terminal. According to the web browser 80 that operates on the OS for a tablet terminal, when a plurality of web pages are opened, only one of the web pages that has been last opened is activated, and the rest of the web pages are made non-active for such purpose as reduction of power consumption. In other words, the one web page is set as an active page, and the rest of the web pages are set as non-active pages.

Under such a circumstance, when the pop-up page 209 is displayed as a latest page, the pop-up page 209 is set as the active page, and the web page 109 is set as the non-active page. In other words, when the pop-up web page 209 is displayed as the active page, the call source web page 109 (also referred to as a parent page) from which the pop-up web page (also referred to as a child page) is called is switched to a non-active state.

As a result, the script C1 in the web page 109 stops its operation. Specifically, periodic transmission of the live-check request stops. As described above, when a periodic live-check request from the browser 80 of the external terminal 50 is not received for a certain period of time, the MFP 10 disconnects the communication session with the browser 80. Specifically, when a certain period of time (e.g., one to several minutes) passes after a last live-check request has been transmitted, the communication session between the external terminal 50 and the MFP 10 is disconnected.

Once the communication session between the external terminal 50 and the MFP 10 is disconnected, the operator of the external terminal 50 is again requested to perform the log-in operation or the like in order to resume the communication between the external terminal 50 and the MFP 10. However, performing such an operation again is cumbersome and inefficient.

Therefore, in this embodiment, the problem due to the fact that the request script C1 in the parent page 100 does not operate is eliminated by causing a new request script C2 in the child page 200 to operate as described next. In the following, the new request script C2 that operates in the child page 200 is described in the data file 230 different from the data file 210 in which a content to be displayed as the child page 200 is described. Specifically, the child page 200 includes a plurality of data files, and the new request script C2 is described in any one of the plurality of data files. Such an example will now be described.

1-5. Operation According to this Embodiment

Figure 6:
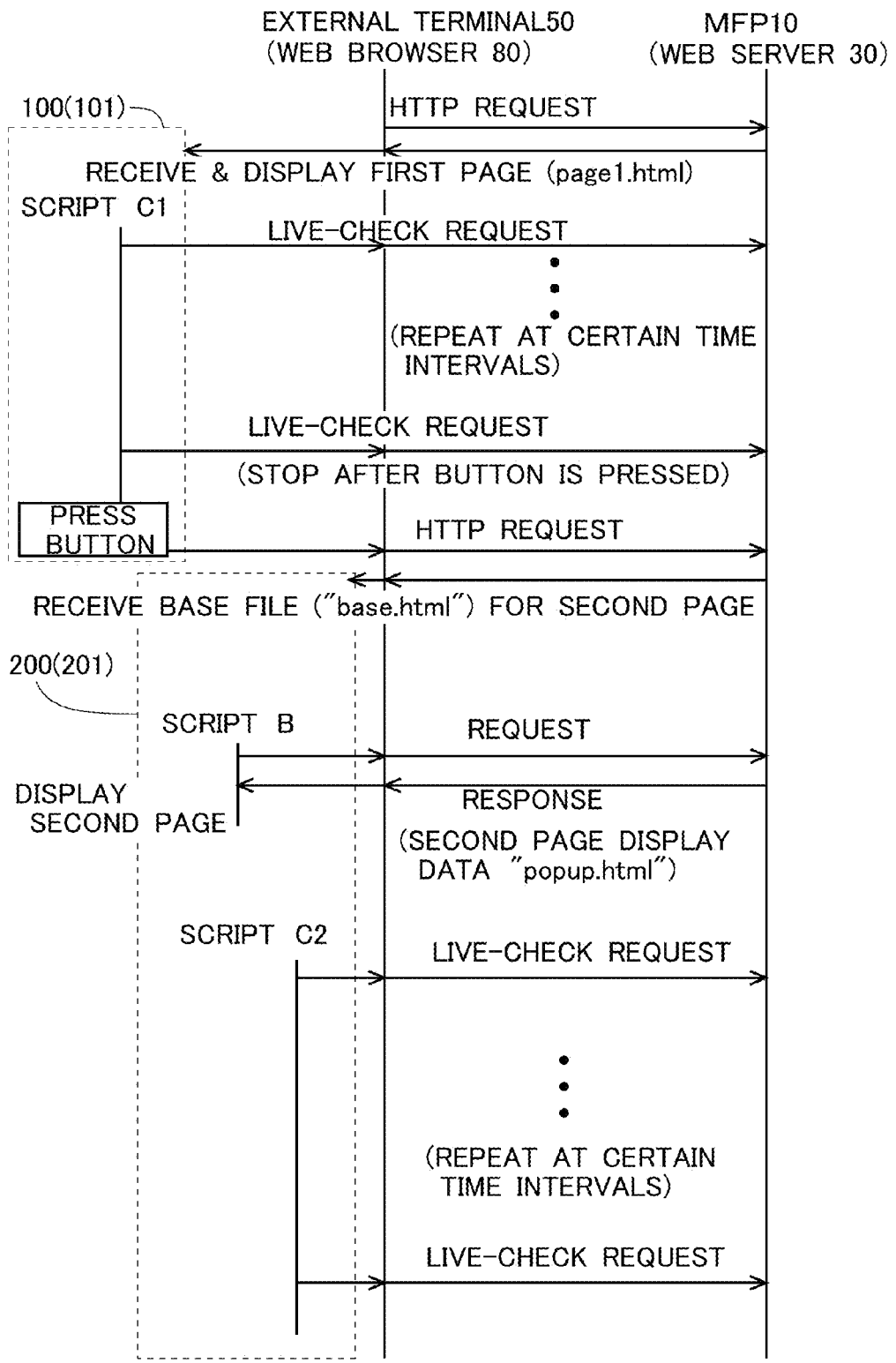
FIG. 6 is a timing chart showing an example of the operation in this system.
Figure 9:
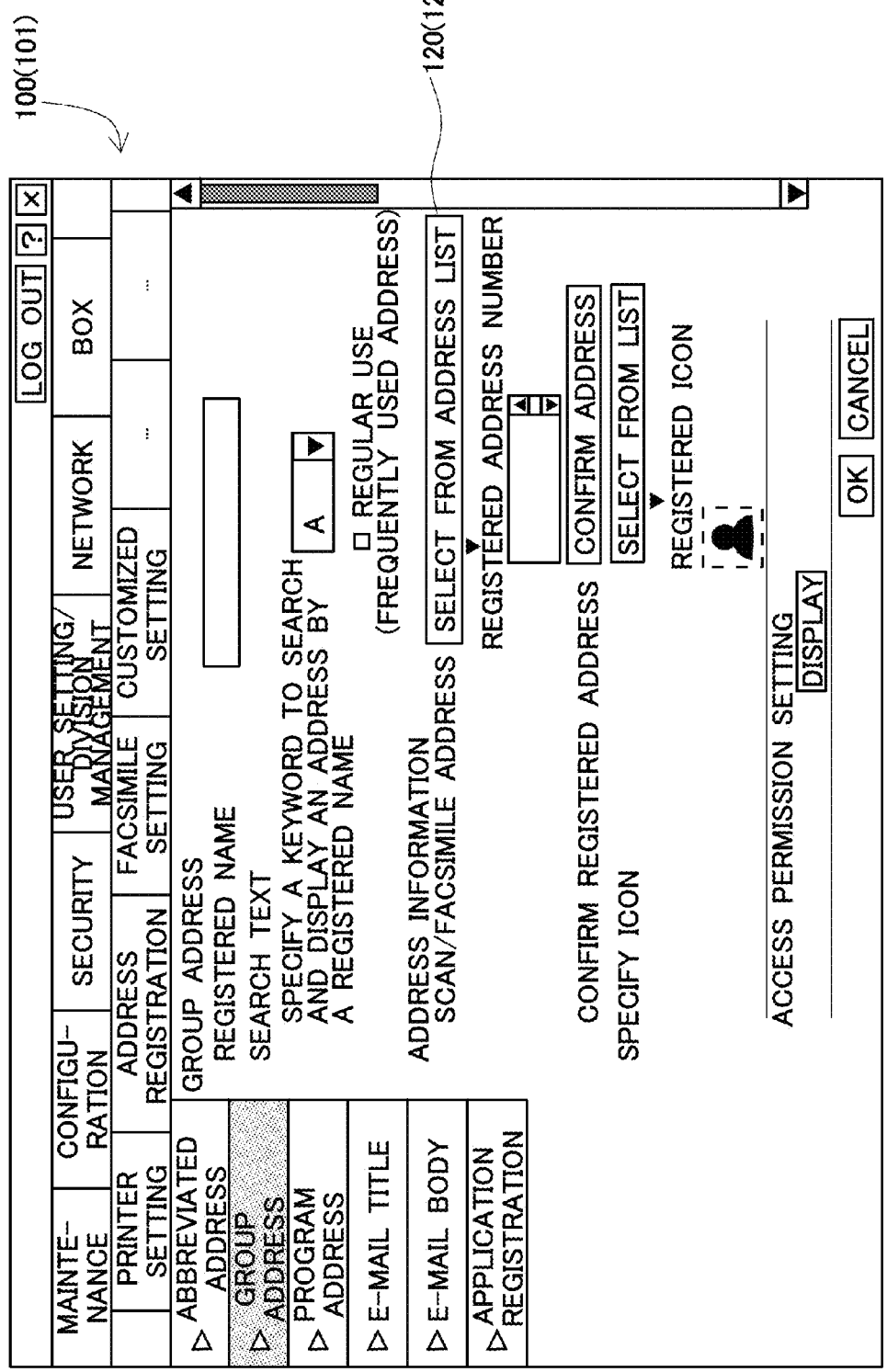
FIG. 9 is an illustration showing one example of a parent page.

Next, the operation of the system 1 according to the first embodiment will be described with reference to FIGS. 4 to 10. FIGS. 4 and 5 are conceptual diagrams illustrating the operation in the system 1. FIG. 6 is a timing chart showing an example of the operation in the system 1, and FIG. 7 is a flow chart showing the management operation of a communication session by the MFP 10 (the web server 30). FIG. 8 is an illustration of one example of a base file 230 (described later). The base file 230 is a data file (a data file described in a page-description language (here, HTML) or the like) that is to be transmitted from the MFP 10 to the external terminal 50 in response to the HTTP request from the external terminal 50 to the MFP 10 when one web page 200 is called from another web page 100. FIG. 9 is an illustration showing one example of the web page 100, and FIG. 10 is an illustration showing one example of the web page 200. The web page 200 is a web page called in response to the user's operation to the web page 100 and displayed as a pop-up. The web page 100 is also referred to as a parent page (or call source page), and the web page 200 is also referred to as a child page (or call target page).

First, similarly to the comparative example, the operator of the external terminal 50 remotely logs in the MFP 10.

Then, as shown at the head of FIG. 6, the external terminal 50 transmits an HTTP request to the MFP 10, in order to display one web page 100 (101) (FIG. 9). Specifically, an HTTP request specifying a specific URL in the MFP 10 (the web server 30) is transmitted from the external terminal 50 to the image forming device 10. The specific URL includes a host name, a path name, and a file name (e.g., "page1.html") relating to the web page data 110 (111) for the web page 100 (see also FIG. 5).

In response to the HTTP request, the MFP 10 (the web server 30) transmits the web page data 110 (111) for the web page 101 ("page1.html") as an HTTP response to the external terminal 50.

The external terminal 50 (the web browser 80) displays the web page 101 in the touch panel 75 based on the received web page data (specifically, data file) 111. For example, the web page 101 as shown in FIG. 9 is displayed in the touch panel 75 (see a left side in FIG. 4). The web page 101 shown in FIG. 9 is a web page having a registration screen for "group address", and used when a "group address" for a scanning operation (and/or facsimile transmission operation) of the MFP 10 is registered using the external terminal 50.

In the web page 101 (FIG. 9), the button 120 (121) for displaying the pop-up page 200 (201) (FIG. 10) is arranged (see FIG. 4). The web page data 110 relating to the web page 100 includes data for displaying the button 120 (described in a page-description language), as well as data indicating a URL of the pop-up page (child page) 200 to be called when the button 120 is pressed. The web page data 110 also includes the script C1.

Further, the web browser 80 of the external terminal 50 executes the script C1 (e.g., a script described in JavaScript (registered trademark)) included in the web page data 111. By executing the script C1, the web browser 80 transmits the live-check request to the MFP 10 at predetermined time intervals Δt1. In other words, after receiving the script C1, the external terminal 50 (the web browser 80) transmits the periodic request based on the script C1 automatically to the web server 30.

Thereafter, when the operator presses the button 120 (121) arranged in the parent page 100 (here, the web page 101), the pop-up page 200 (201) is displayed (FIG. 10) (see a right side in FIG. 4). The pop-up page (web page) 201 in FIG. 10 includes a displayed screen for an "abbreviated address list".

Specifically, when the button 121 is pressed by the operator, the external terminal 50 transmits an HTTP request specifying a different URL in the web server 30 based on the description in the web page data 111 ("page1.html") (see around a middle in FIG. 6). The different URL includes a host name, a path name, and a file name (here, "base.html") relating to the web page data (specifically, data file) 230 (231) (FIG. 8) relating to a different web page. In this embodiment, the data file 230 is first called before the data file 210 itself in which a content to be displayed in the web page 200 is described. The data file 230 is also referred to as a base file or a base data file.

In response to the HTTP request transmitted from the browser (in other words, a new page call command (pop-up page display command)), the MFP 10 transmits the web page data 230 ("base.html") to the web browser 80.

In this embodiment, the pop-up page 201 includes two data files of a data file 211 ("popup.html") and the data file 230 (231) (here, "base.html"), and the like.

The data file 211 is data for displaying the web page 201, in which a content to be displayed in the web page 201 is described.

On the other hand, the data file 230 (231) is a data file relating to the web page (child page) 201 different from the web page (parent page) 101, and is described in a page-description language (such as HTML) and a script (such as a JavaScript (registered trademark)). However, the data file 230 does not include a description for a content itself to be displayed in the web page 201. The data file 230 is a data file that does not depend on the content to be displayed in the web page 201. By using the data file 230 that is standardized (generalized), it is possible to easily construct a child page including the script C2.

As shown in FIG. 5, the data file 230 includes a read script B. Via the read script B, the data file 211 in which the content to be displayed in the web page 201 is actually described (a data file for displaying a page) is read, and the web page 201 is displayed.

Specifically, a URL set to a variable popupURL is read as data to be displayed in the web page 201 based on descriptions such as the read script B described for example in a region P1 within a script description area in the page data 110 shown in FIG. 8 and a description relating to an inline frame in a region P2 within a body description area in the page data 110. Here, it should be noted that the variable popupURL is set to indicate the URL for the data file 211 within the data file 111 of the parent page 101 (FIG. 4) (specifically, popupURL=(host name+path name+) "pop-up.html"). Then, a value of the variable popupURL (URL) is referred in the data file 230, and the web page 201 including a content described in the data file 211 "popup.html" set as the value of the variable popupURL is displayed.

Specifically, a request is transmitted from the web browser 80 (the external terminal 50) to the web server 30 (the MFP 10) by the operation of the read script B or the like, and in response to the request, the data file 211 ("popup.html") is transmitted to the external terminal 50 as a response. Then, the external terminal 50 (the web browser 80) displays the web page 201 in the touch panel 75 based on the received data file 211. For example, the pop-up page 201 in FIG. 10 is displayed in the touch panel 75 (also see the right side in FIG. 4). As a result, the pop-up screen 201 opens similarly to the comparative example.

Here, as illustrated in FIG. 5, the data file 230 (231) also includes the script C2 (C21). In addition, the script C2 (e.g., a script described in JavaScript (registered trademark)) is executed. The script C2 is a script (live-check script) having the same function as that of the script C1, and has a function for periodically transmitting the live-check request to the MFP 10. More specifically, the script C2 is a script for automatically transmitting a periodic request from the web browser 80 to the web server 30 while the pop-up web page is being displayed. The periodic request by the script C2 has the same function as that of the periodic request by the script C1.

By executing the script C2, the web browser 80 transmits the live-check request to the MFP 10 at predetermined time intervals Δt1 (see a lower part in FIG. 6).

More specifically, based on descriptions at portions P3, P4, and P5 in FIG. 8, the live-check script C2 operates periodically in the web page 201. Specifically, a function "LiveCheck" defined at the portion P3 is executed every 30 seconds as described at the portion P5. More specifically, as described at the portion P4 in FIG. 8, a different data file ("livecheck_data.html") is referred from the data file 230 ("base.html"). By periodically reloading the data file "livecheck_data.html" (see the portion P3), a periodic request is transmitted from the external terminal 50 (the web browser 80) to the MFP 10 (the web server 30), and a response to this request is transmitted back from the MFP 10 to the external terminal 50. However, in FIG. 6, the response to this request is not shown.

In this manner, after receiving the script C2, the external terminal 50 automatically transmits a periodic request based on the script C2 to the web server 30. In other words, while the child page (the web page 201) is displayed, the script C2 (in place of the script C1) is executed at predetermined time intervals Δt1, and the live-check request is periodically transmitted to the MFP 10.

On the other hand, the operation control unit 15 of the MFP 10 executes the management operation of a communication session similarly as described with reference to FIG. 7.

As described above, in this embodiment, even when the external terminal 50 does not transmit a periodic request based on the script C1 due to the termination of the script C1, the external terminal 50 periodically transmits a periodic request based on the script C2. As a result, even when the MFP 10 does not receive the periodic request based on the script C1, the MFP 10 periodically receives the periodic request based on the script C2.

Then, even when a periodic request based on the script C1 from the web browser 80 is not received over a certain period of time, the operation control unit 15 of the MFP 10 maintains the communication session with the web browser 80 if a periodic request based on the script C2 from the web browser 80 is received within the certain period of time.

Therefore, it is possible to eliminate the problem that a communication session between the external terminal 50 and the MFP 10 is disconnected due to the fact that the request script C1 in the parent page 101 does not operate when the parent page 100 (101) becomes non-active and the child page 200 (201) becomes active.

Further, in the above embodiment, the script C2 in the child page 200 is described separately from display data for displaying the child page 200 (a specific part of an HTML document (specific area)), and not mixed with the display data. In other words, the display data for displaying the child page 200 and the script C2 in the child page 200 are blocked and described in parts separate from each other. More specifically, the new script C2 is not described in the data file 211 ("popup.html") for displaying the child page 200, and the new script C2 is described in the data file 230 (231) different from the data file 211.

Further, in response to a calling command for calling the child page 200 (a new page call command), the web server 30 first transmits, to the web browser 80, the data file (also referred to a base file) 230 in which the read script B is described out of the plurality of the data files 211 and 230 in which the data relating to the child page 200 is described dispersedly. Then, the web server 30 transmits the data file 211 to the web browser 80 based on the read script B described in the base file 230 in response to a transmission request transmitted from the web browser 80 (a request for transmission of the data file 211). Then, the web browser 80 displays the child page 200 based on the content specified in the data file 211. Specifically, by the data file 211 for display being read based on the read script B described in the data file 230, a display content specified in the data file 211 for display is displayed in a display screen of the child page 200.

In other words, in response to the calling command for the child page 200 (the new page call command), the web server 30 transmits the data including the read script B out of the data relating to the child page 200 to the web browser 80, and makes the web browser 80 execute the read script B. By making the web browser 80 execute the read script B, the web server 30 makes the web browser 80 read (refer) the data file 211 for display (the display data file for the child page 200), and makes the child page 200 be displayed based on the data file 211 for display in the web browser 80.

In particular, as an additional portion relating to the scripts C2 and B is described in the data file 230 different from the data file 211 for display, it is not necessary to alter the data file 211 for display. In other words, an additionally altered portion to the data for the child page 200 is provided separately from the data file 211 for display, and it is possible to minimize the alteration to the original data file. It should be noted that the alteration relating to the parent page 100 is minimized (to an addition of a variable value specifying a call target page, or the like).

As described above, by adding the script C2 using the data file 230, requesting may be periodically performed based on the script C2 while the child page 200 is being displayed. Further, by adding the read script B using the data file 230 and by reading the data file 211 for display using the read script B, it is possible to display the child page 200 while minimizing the alteration to the parent page 100 (to an addition of a variable value, or the like), and without making alteration to the data file 211 for display.

Moreover, in a case in which the operation described above is performed to a plurality of sets of a parent page and a child page (100, 200), it is preferable to use the data file 230 described above. According to this, it is possible to add the script C2 easily to each of the plurality of child pages and to display based on each of the display data files without making alteration to each of display data files for the plurality of child pages (a plurality of display data files similar to the data file 211). In particular, it is possible to easily make alteration to (reconstruct) each child page by using a common (the same) data file 230 for each of the plurality of child pages.

1-6. Modified Example

In the first embodiment described above, the case in which a new data file "base.html" is always read when the button 120 in the parent page 100 is pressed is described as an example. In other words, the case in which the parent page 100 reads the file "base.html" always regardless of a type of the web browser 80 of the external terminal 50 is described.

However, the present invention is not limited to such an example. For example, a file to be read may be different depending on the type of the web browser 80 of the external terminal 50. More specifically, either of the original data file 211 ("popup.html") and the new data file 230 ("base.html") may be read, depending on whether the web browser 80 is a browser of a personal computer or of a tablet terminal.

FIG. 11 is an illustration of a data file 110 (115) ("page1.html") for executing an operation according to such a modified example. Here, it is determined whether the web browser 80 is a browser of a personal computer or of a tablet terminal based on whether or not the web browser 80 supports "ActiveX".

As shown at the head of FIG. 11 (in particular, from a first line to a fifth line), depending on whether or not the web browser 80 is a browser of a personal computer or of a tablet terminal, a different value is set as a variable popupURL2, and a page based on page data set to the variable popupURL2 is opened.

Specifically, if it is determined that the web browser 80 is a browser of a tablet terminal (a browser executed on an OS for a tablet terminal (such as "Android" (registered trademark))), "base.html" is set to the variable popupURL2 to call the data file "base.html" after the new page call command, and thus the operation similar to that in the first embodiment is realized. With this, the same effect as that in the first embodiment may be obtained.

On the other hand, if it is determined that the web browser 80 is a browser of a personal computer (a browser executed on an OS for a personal computer (such as "Windows" (registered trademark))), "popup.html" is set to the variable popupURL2 and the data file "popup.html" is called after the new page call command. Specifically, in response to the new page call command, data not including the script C2 (data only includes the data file 211) is transmitted (in place of the data including the script C2) from the web server 30 to the web browser 80. Then, the web page 201 is displayed in the web browser 80 based on the data file 211. To put it shortly, the operation similar to that in the comparative example is realized. However, as the web browser 80 is a browser of a personal computer, the script C1 in the parent page may remain activated after the child page is displayed in a pop-up, and the above problem does not occur. In other words, the original script C1 is performed periodically even if the script C2 called from the data file 230 ("base.html") is not performed periodically, and therefore the communication session continues. Specifically, it is possible to prevent the communication session from being disconnected (unwillingly). Further, it is possible to suppress communication traffic, as compared to the case in which both of the script C2 in the child page and the script C1 in the parent page operate.

2. Second Embodiment

In the first embodiment, the example in which a live-check request is transmitted as a periodic request to the web server 30 is described.

In a second embodiment, an example in which a request for requesting the device status information of the MFP 10 is transmitted as a periodic request to the web server 30 is described. In the following, the second embodiment will be described focusing on differences from the first embodiment.

Figure 18:
FIG. 18 is an illustration showing one example of a child page according to the second embodiment.

FIG. 12 and FIG. 13 are conceptual diagrams illustrating an operation in the system 1 (also referred to as 1B) according to the second embodiment. FIG. 14 is a timing chart showing an example of the operation in the system 1B. FIG. 15 is an illustration of a data file 230 (232) ("base2.html"). The data file 232 is a data file that is to be transmitted from the MFP 10 to the external terminal 50 in response to the HTTP request from the external terminal 50 to the MFP 10 when one web page (child page) 200 (202) is called from another web page (parent page) 100 (102). FIG. 16 is an illustration of a data file ("status.html") that is updated as necessary by the MFP 10. FIG. 17 is an illustration showing one example of the web page 102, and FIG. 18 is an illustration showing one example of the web page 202. Here, the web page 102 is a parent page in which the device status information of the MFP 10 is displayed, and the web page 202 is a child page in which detailed information as a part of the device status information is displayed.

Hereinafter, the operation of the system 1 according to the second embodiment will be described with reference to FIGS. 12 to 18.

First, similarly to the first embodiment, the operator of the external terminal 50 remotely logs in the MFP 10.

Then, as shown at the head of FIG. 14, the external terminal 50 transmits an HTTP request to the MFP 10, in order to display one web page 100 (102) (FIG. 17). Specifically, an HTTP request specifying a specific URL in the web server 30 of the MFP 10 is transmitted from the external terminal 50 to the image forming device 10. The specific URL includes a host name, a path name, and a file name (e.g., "page21.html") relating to the data file 110 (112) for the web page 102 (see also FIG. 13). Here, the web page 102 shown in FIG. 17 is a web page in which the device status information of the MFP 10 is displayed, and used when confirming a device status of the MFP 10.

In response to the HTTP request, the MFP 10 (the web server 30) transmits the data file 112 for the web page 102 ("page21.html") as an HTTP response to the external terminal 50.

The external terminal 50 (the web browser 80) displays the web page 102 (FIG. 17) in the touch panel 75 based on the data file 112 that has been received. In the web page 102 (FIG. 17), the button 120 (122) for displaying the pop-up page 200 (202) (FIG. 18) is arranged (see FIG. 12).

Further, the web browser 80 of the external terminal 50 executes the script C21 included in the data file 112. The script C21 is a script having a function of periodically transmitting a request for the device status information of the MFP 10 (also referred to as a status information update request) to the MFP 10. By executing the script C21, the web browser 80 transmits the status information update request to the MFP 10 at predetermined time intervals Δt1. In response to the status information update request, the web server 30 transmits the device status information of the MFP 10 (such as information relating to a remaining amount of toner and presence or absence of paper) to the web browser 80. Based on the information received from the web server 30, the web browser 80 updates a content in a device status display section (including a device status information field (a field for "presence or absence of paper") and the like provided in the button 122 in the web page 102) in the web page 102. Such an update operation is repeatedly performed at predetermined time intervals Δt1 during a time period in which the web page 102 is displayed.

Thereafter, when the operator presses the button 122 arranged in the parent page 102, the child page 202 (FIG. 18) is displayed (see a right side in FIG. 12). The child page (pop-up page) 202 in FIG. 18 includes a display portion (display area) in which a status of a "paper feed tray" of the MFP 10 (a size, a type, and a remaining amount of paper for one tray) are shown in detail.

Specifically, when the button 122 is pressed by the operator, the external terminal 50 transmits an HTTP request specifying a different URL in the web server 30 based on the description in the data file 112 ("page21.html"). The different URL includes a host name, a path name, and a file name (here, "base2.html") relating to the data file 230 (232) for another web page.

In response to the HTTP request transmitted from the browser (in other words, a new page call command (pop-up page display command)), the MFP 10 transmits the data file 232 to the web browser 80.

In this embodiment, the web page (child page) 202 includes two data files of the data file 212 ("popup2.html") and the data file 232 ("base2.html"), and the like.

The data file 212 is data for displaying the web page 202, in which a content to be displayed in the web page 202 is described.

On the other hand, the data file 232 is data relating to the web page (child page) 202 different from the web page (parent page) 102, and is described in a page-description language (such as HTML) and a script (such as JavaScript (registered trademark)). However, similarly to the data file 231, the data file 232 does not include a description for a content itself to be displayed in the web page 202. The data file 232 is data that does not depend on the content to be displayed in the web page 202.

As shown in FIG. 13, the data file 232 includes a read script B2. Via the read script B2, the data file 212 in which the content to be displayed in the web page 202 is (actually) described is read, and the web page 202 is displayed.

Specifically, a URL set to a variable popupURL is read as data to be displayed in the web page 202 based on descriptions such as the read script B2 described for example in a region P21 in the page data 112 shown in FIG. 15, and a description relating to an inline frame in a region P22 within a body description area in the page data 112. Here, it should be noted that the variable popupURL is assumed to be set to indicate the URL for the data file 212 within the data file 112 of the parent page 102 (FIG. 13) (specifically, popupURL= (host name+path name+) "popup2.html"). Then, a value of the variable popupURL (URL) is referred in the data file 232, and the web page 202 including a content described in the data file 212 "popup2.html" set as the value of the variable popupURL is displayed.

Specifically, a request is transmitted from the web browser 80 (the external terminal 50) to the web server 30

(the MFP 10) by the operation of the read script B2 or the like, and in response to the request, the data file 212 ("popup2.html") is transmitted to the external terminal 50 as a response. Then, the external terminal 50 (the web browser 80) displays the web page 202 (FIG. 18) in the touch panel 75 based on the received data file 212.

Here, as illustrated in FIG. 13, the data file 232 also includes the script C2 (C22). In addition, the script C22 is executed while the child page 202 is being displayed. The script C22 is a script having a function of periodically transmitting a request for transmission of the device status information of the MFP 10 (the status information update request) to the MFP 10. By executing the script C22, the web browser 80 transmits the status information update request to the MFP 10 at predetermined time intervals Δt1.

More specifically, based on descriptions at portions P23, P24, P25, and P26 in FIG. 15, the script C22 for obtaining the status information operates periodically in the web page 202. Specifically, a function "StatusUpdate" defined at the portion P23 is executed every 30 seconds as described at the portion P25.

As described at the portion P26 in FIG. 15, a different data file ("status.html") is called from the data file 232 ("base2.html"). The data file "status.html" is a file in which the device status of the MFP 10 (such as information relating to a remaining amount of toner and presence or absence of paper) is described, and separately updated by the MFP 10 as necessary. FIG. 16 is an illustration showing one example of the data file "status.html". As shown in FIG. 16, the data file "status.html" includes description such as an element relating to presence or absence of paper "<div id="child_status"> there is no paper</div>" (see the portion P31). At the portion described as "there is no paper", either of "there is paper" and "there is no paper" is described depending on paper status of the MFP 10.

Further, the data file 112 for the parent page includes description (<div id="parent_status"> there is paper </div>) for defining an element "parent_status" relating to "presence or absence of paper", for example.

Moreover, as described at the portion P24 in FIG. 15, a content of an element "child_status" in the data file "status.html" is reflected on the element "parent_status" in the parent page. Further, in such a state, the function "StatusUpdate" defined at the portion P23 in FIG. 15 is executed every 30 seconds as described at the portion P25.

In this manner, the script C22 is executed at predetermined time intervals Δt1, and the status information update request is periodically transmitted to the MFP 10.

On the other hand, the operation control unit 15 of the MFP 10 transmits the status information of the MFP 10 to the web browser 80 in response to a periodic request (status information update request) from the web browser 80. Specifically, the data file "status.html" including the status information of the MFP 10 is transmitted from the web server 30 to the web browser 80.

In this manner, the web browser 80 (the external terminal 50) receives the status information of the MFP 10 periodically (at predetermined time intervals Δt1).

Then, the web browser 80 reloads the received data file "status.html". Further, as shown at the portion P24 in FIG. 15, the web browser 80 reflects the status information described in the element "child_status" in the data file "status.html" (the information relating to "presence or absence of paper" (in other words "whether or not paper runs out")) in a content to be displayed by the element "parent_status" in the parent page. With this, a content to be displayed by the button 122 in the parent page 102 is periodically updated in an appropriate manner. It should be noted that updating of the content to be displayed by the button 122 in the parent page 102 is described in the above, but the present invention is not limited to this, and other elements in the parent page 102 may similarly be updated.

Here, when a display area for the information relating to whether or not "paper runs out" is included in the parent page, and if a script for periodically updating the content to be displayed by the display area is only included in the parent page, a problem as described below may occur. Specifically, when a child page is called from a parent page displayed by the web browser, the child page is made active, and the parent page is made non-active, there may be a problem that the device information update script for the parent page does not operate and the device information of the parent page may not be updated while the child page is displayed. More specifically, in a case in which the child page called from the parent page is arranged next to the parent page, for example, the non-active parent page may be viewed by the user, but the status information displayed in the parent page is not updated and does not reflect the latest status information. As a result, the device information field in the parent page displays a content that is different form the latest status (current status).

By contrast, in the second embodiment, when a new page call command for calling the child page 102 from the parent page 202 (pop-up page display command) is transmitted from the web browser 80 to the web server 30, the data including the data file 232 is transmitted from the web server 30 to the web browser 80 in response to the new page call command. The data file 232 includes the script C22 for automatically transmitting a periodic request from the web browser 80 to the web server 30 while the child page 102 is displayed. The script C22 operates in the web browser 80 to which the script is transmitted, and a periodic request (status information update request) is transmitted from the web browser 80 to the web server 30 according to the script C22. In response to the status information update request, the web server 30 transmits data including the device status information of the MFP 10 as a response to the web browser 80. Further, the web browser 80 updates the display content of the device information display area in the parent page, based on the device status information received from the web server 30. In FIG. 14, an illustration of the response to the status information update request is not shown.

In particular, even when a periodic request from the web browser 80 based on the parent page 102 (the status information update request based on the script C21) is not received over a certain period of time, the web server 30 transmits the status information of the MFP 10 to the web browser 80 in response to the status information update request based on the script C22 in the child page, if a periodic request from the web browser 80 based on the child page 202 (the status information update request based on the script C22) is received within the certain period of time. Further, in response to the status information update request from the web browser 80, the web server 30 receives the status information of the MFP 10, and updates the content to be displayed in the parent page 102 based on the status information.

Therefore, even when the child page is called from the parent page displayed by a web browser, and the child page becomes active and the parent page becomes non-active, the device information update script embedded in the child page operates (while the device information update script in the parent page does not operate). As a result, it is possible to update the device information in the parent page even when the parent page is not active.

As described above, according to the second embodiment, the problem described above may be eliminated.

While the same operation as described above may be performed with any of child pages that are called from the parent page, the present invention is not limited to such an example. Specifically, the script C2 for automatically transmitting a periodic request from the child page may not be executed with a part of the child pages that are called from the parent page.

In other words, for a specific parent-child page set which is one of a plurality of parent-child page sets (100, 200) having web page data stored in the web server 30 and that is different from a parent-child page set including the web pages 102 and 202 as described above, the script C2 may not be executed. For example, a parent page in the specific parent-child page set is a web page indicating presence or absence of a hardware failure, and a child page in the specific parent-child page set is a web page indicating information relating to the hardware failure, the script C2 may not be executed. Specifically, the web server 30 may transmit response data as described below to the web browser 80 in response to a page call command for calling a child page from a parent page (a child page calling command transmitted from the web browser 80). This response data may be configured so as not to include a script for automatically transmitting a periodic request from the web browser 80 to the web server 30 (status information update request) while the child page is being displayed.

In a case of hardware failures, as it requires relatively long time before restoration, it is less likely that the device status changes relatively early. In such a case, it is possible to prevent unnecessary communication traffic from being produced by not executing the script C22 for updating the status. It is also possible to prevent resource of the MFP 10 (and the external terminal 50) from being wasted.

Further, the second embodiment may also be modified similarly to the first embodiment. For example, a file to be read may be different depending on the type of the web browser 80 of the external terminal 50.

3. Modified Examples

While the embodiments of the present invention have been described in the above, the present invention is not limited to the contents described above.

For example, in the embodiments, the data file 230 is provided as a data file for the child page 200, in addition to the data file 210 in which the content to be displayed in the child page 200 is described, and the periodic script C is described in the data file 230. However, the present invention is not limited to such an example.

Specifically, a script having the same function as the periodic script C may be directly described in the data file 210 in which the content to be displayed in the child page 200 is described. However, it is preferable in view of standardization that the data file 230 different from the data file 210 is provided and the periodic script C is described in the data file 230, as in the embodiments described above. In other words, the child page 200 may be configured by a plurality of data files, or by a single data file. Further, the plurality of data files relating to the child page 200 may be transmitted either sequentially (not at the same time) or at the same time, in response to a new page call command. This also applies to the parent page 100.

While the invention has been shown and described in detail, the foregoing description is in all aspects illustrative and not restrictive. It is therefore understood that numerous modifications and variations can be devised without departing from the scope of the invention.

What is claimed is:

1. An image forming device having a function of a web server, the device comprising:
a hardware processor configure to:
receive a data transmission request from an external device, the data transmission request relating to a first web page; and
transmit first data to the external device in response to the data transmission request, the first data including:
first display data for displaying the first web page in a browser of the external device;
data for calling a second web page from the first web page; and
a first script for automatically transmitting first periodic requests as periodic requests from the browser to the web server,
wherein the hardware processor transmits second data to the external device in response to a new page call command transmitted from the external device, the new page call command being for calling the second web page from the first web page, the second data including:
second display data for displaying the second web page in the browser; and
a second script for automatically transmitting second periodic requests as periodic requests from the browser to the web server while the second web page is being displayed.

2. The image forming device according to claim 1, wherein
the second display data and the second script are respectively described in data files that are different from each other.

3. The image forming device according to claim 2, wherein
the second data includes a read script for reading the second display data for displaying the second web page in the browser, and
the hardware processor causes the second display data for the second web page to be read by the browser and causes the second web page based on the second display data to be displayed in the browser, by transmitting data including the read script out of the second data to the external device and causing the read script to be executed by the browser, in response to the new page call command.

4. The image forming device according to claim 2, wherein
the second data includes a read script for reading the second display data for displaying the second web page in the browser,
the second display data and the read script are respectively described in data files that are different from each other, and
the hardware processor transmits a base file in which the read script is described to the external device in response to the new page call command, the base file being one of a plurality of data files in which the second data is dispersedly described, and then transmits a display file in which the second display data is described to the external device in response to a transmission request transmitted from the external device based on the read script described in the base file, the transmission request requesting transmission of the display file.

5. The image forming device according to claim 4, wherein
the base file includes a description relating to the second script, and
the hardware processor receives the second periodic requests after the base file is received by the external device, the second periodic requests being executed based on the description relating to the second script in the base file.

6. The image forming device according to claim 1, further comprising:
an operation control unit configured to disconnect a communication session with the browser when the first periodic requests from the browser are not received for a certain period of time,
wherein even when the first periodic requests from the browser are not received for the certain period of time, if the second periodic requests from the browser are received within the certain period of time, the operation control unit maintains the communication session with the browser.

7. The image forming device according to claim 1, wherein the hardware processor is further configured to:
transmit status information of the image forming device in response to the first periodic requests from the browser,
wherein even when the first periodic requests from the browser are not received for a certain period of time, if the second periodic requests from the browser are received within the certain period of time, the hardware processor transmits the status information of the image forming device to the external device in response to the second periodic requests.

8. The image forming device according to claim 7, wherein
in a case in which, a specific parent-child page set includes a parent page as a web page indicating presence or absence of a hardware failure and a child page as a web page indicating information relating to the hardware failure, the specific parent-child page set being one of a plurality of parent-child page sets for which web page data is stored in the web server, and being different from a first parent-child page set including the first web page and the second web page,
the hardware processor transmits response data to the external device in response to the new page call command transmitted from the external device, the new page call command being for calling the child page from the parent page, and
the response data does not include a script for automatically transmitting a periodic request from the browser to the web server while the child page is being displayed.

9. The image forming device according to claim 1, wherein the hardware processor is further configured to:
determine whether the browser is a web browser running on an OS for a personal computer or a web browser running on an OS for a tablet terminal,
wherein the hardware processor:
transmits the second data including the second script in response to the new page call command, when the browser is determined to be a web browser running on an OS for a tablet terminal, and
transmits data not including the second script in place of the second data in response to the new page call command, when the browser is determined to be a web browser running on an OS for a personal computer.

10. The image forming device according to claim 1, wherein the first script automatically transmits the first periodic requests from the browser to the web server at predetermined time intervals.

11. A web application system comprising:
an image forming device having a function of a web server; and
an external device capable of executing a browser,
wherein, the web server includes:
a hardware processor configured to:
receive a data transmission request from the external device, the data transmission request relating to a first web page; and
transmit first data to the external device in response to the data transmission request, the first data including:
first display data for displaying the first web page in the browser of the external device;
data for calling a second web page from the first web page; and
a first script for automatically transmitting first periodic requests as periodic requests from the browser to the web server
wherein the hardware processor transmits second data to the external device in response to a new page call command transmitted from the external device, the new page call command being for calling the second web page from the first web page, the second data including:
second display data for displaying the second web page in the browser; and
a second script for automatically transmitting second periodic requests as periodic requests from the browser to the web server while the second web page is being displayed, and
the browser:
after receiving the first script included in the first data, automatically transmits the first periodic requests to the web server based on the first script, and
after receiving the second script included in the second data, automatically transmits the second periodic requests to the web server based on the second script.

12. The web application system according to claim 11, wherein the first script automatically transmits the first periodic requests from the browser to the web server at predetermined time intervals.

13. The web application system according to claim 11, wherein the hardware processor is further configured to:
transmit status information of the image forming device in response to the first periodic requests from the browser,
wherein even when the first periodic requests from the browser are not received for a certain period of time, if the second periodic requests from the browser are received within the certain period of time, the hardware processor transmits the status information of the image forming device to the external device in response to the second periodic requests.

14. The web application system according to claim 13, wherein
in a case in which, a specific parent-child page set includes a parent page as a web page indicating presence or absence of a hardware failure and a child page as a web page indicating information relating to the hardware failure, the specific parent-child page set being one of a plurality of parent-child page sets for which web page data is stored in the web server, and being different from a first parent-child page set including the first web page and the second web page, the hardware processor transmits response data to the external device in response to the new page call command transmitted from the external device, the new page call command being for calling the child page from the parent page, and the response data does not include a script for automatically transmitting a periodic request from the browser to the web server while the child page is being displayed.

15. The web application system according to claim 11, wherein the hardware processor is further configured to:
determine whether the browser is a web browser running on an OS for a personal computer or a web browser running on an OS for a tablet terminal,
wherein the hardware processor:
transmits the second data including the second script in response to the new page call command, when the browser is determined to be a web browser running on an OS for a tablet terminal, and
transmits data not including the second script in place of the second data in response to the new page call command, when the browser is determined to be a web browser running on an OS for a personal computer.

16. A non-transitory computer-readable recording medium recording a program causing a computer, built within an image forming device having a function of a web server, to execute the steps of:
a) receiving a data transmission request from an external device, the data transmission request relating to a first web page;
b) transmitting first data to the external device in response to the data transmission request, the first data including:
first display data for displaying the first web page in a browser of the external device;
data for calling a second web page from the first web page; and
a first script for automatically transmitting first periodic requests as periodic requests from the browser to the web server
c) receiving a new page call command transmitted from the external device, the new page call command being for calling the second web page from the first web page; and
d) transmitting second data to the external device in response to the new page call command, the second data including:
second display data for displaying the second web page in the browser; and
a second script for automatically transmitting second periodic requests as periodic requests from the browser to the web server while the second web page is being displayed.

17. The non-transitory computer-readable recording medium according to claim 16, wherein
the second display data and the second script are respectively described in data files that are different from each other.

18. The non-transitory computer-readable recording medium according to claim 17, wherein
the second data includes a read script for reading the second display data for displaying the second web page in the browser, and
in the step d), the second display data for the second web page is caused to be read by the browser and the second web page based on the second display data is caused to be displayed in the browser, by causing data including the read script out of the second data to be transmitted to the external device and causing the read script to be executed by the browser, in response to the new page call command.

19. The non-transitory computer-readable recording medium according to claim 17, wherein
the second data includes a read script for reading the second display data for displaying the second web page in the browser,
the second display data and the read script are respectively described in data files that are different from each other, and
the step d) includes the steps of:
d-1) transmitting a base file in which the read script is described to the external device in response to the new page call command, the base file being one of a plurality of data files in which the second data is dispersedly described; and
d-2) after the step d-1), transmitting a display file in which the second display data is described to the external device in response to a transmission request transmitted from the external device based on the read script described in the base file, the transmission request requesting transmission of the display file.

20. The non-transitory computer-readable recording medium according to claim 19, wherein
the base file includes a description relating to the second script, and
the step d) includes the step of:
d-3) receiving the second periodic requests after the base file is received by the external device, the second periodic requests being executed based on the description relating to the second script in the base file.

21. The non-transitory computer-readable recording medium according to claim 16, wherein
the program causes the computer to further execute the step of:
e) disconnecting a communication session with the browser when the first periodic requests from the browser are not received for a certain period of time, and
in the step e), even when the first periodic requests from the browser are not received for the certain period of time, if the second periodic requests from the browser are received within the certain period of time, the communication session with the browser is maintained.

22. The non-transitory computer-readable recording medium according to claim 16, wherein
the program causes the computer to further execute the step of:
f) transmitting status information of the image forming device in response to the first periodic requests from the browser, and
in the step f), even when the first periodic requests from the browser are not received for a certain period of time, if the second periodic requests from the browser is received within the certain period of time, the status information of the image forming device is transmitted to the external device in response to the second periodic requests.

23. The non-transitory computer-readable recording medium according to claim 22, wherein
the program causes the computer to further execute the steps of:

g) in a case in which, a specific parent-child page set includes a parent page as a web page indicating presence or absence of a hardware failure and a child page as a web page indicating information relating to the hardware failure, the specific parent-child page set being one of a plurality of parent-child page sets for which web page data is stored in the web server, and being different from a first parent-child page set including the first web page and the second web page, receiving the new page call command transmitted from the external device, the new page call command being for calling the child page from the parent page; and h) transmitting response data to the external device in response to the new page call command, the response data not including a script for automatically transmitting a periodic request from the browser to the web server while the child page is being displayed.

24. The non-transitory computer-readable recording medium according to claim 16, wherein the program causes the computer to further execute the step of:

i) determining whether the browser is a web browser running on an OS for a personal computer or a web browser running on an OS for a tablet terminal, and in the step d), the second data including the second script is transmitted in response to the new page call command, when the browser is determined to be a web browser running on an OS for a tablet terminal, and data not including the second script is transmitted in place of the second data in response to the new page call command, when the browser is determined to be a web browser running on an OS for a personal computer.

25. The non-transitory computer-readable recording medium according to claim 16, wherein the first script automatically transmits the first periodic requests from the browser to the web server at predetermined time intervals.

* * * * *